(12) United States Patent
Mattern et al.

(10) Patent No.: US 9,302,396 B2
(45) Date of Patent: Apr. 5, 2016

(54) APPARATUS FOR THE AUTOMATED HANDLING OF WORKPIECES

(71) Applicant: Liebherr-Verzahntechnik GmbH, Kempten (DE)

(72) Inventors: Thomas Mattern, Rieden (DE); David Haenschke, Altusried (DE); Bernhard Riedmiller, Wertach (DE); Alois Mundt, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 141 days.

(21) Appl. No.: 13/929,652

(22) Filed: Jun. 27, 2013

(65) Prior Publication Data

US 2014/0025197 A1 Jan. 23, 2014

(30) Foreign Application Priority Data

Jun. 29, 2012 (DE) .......................... 10 2012 012 988
Jun. 18, 2013 (EP) ....................................... 13003099

(51) Int. Cl.
*B25J 13/08* (2006.01)
*B25J 19/06* (2006.01)

(52) U.S. Cl.
CPC .............. *B25J 13/08* (2013.01); *B25J 19/063* (2013.01)

(58) Field of Classification Search
CPC .. G05B 13/02; G05B 19/4182; G05B 19/425; G05B 2219/31166; G05B 2219/32239; G05B 2219/33053; G05B 2219/33057; G05B 2219/33297; G05B 2219/34012
See application file for complete search history.

(56) References Cited

U.S. PATENT DOCUMENTS

| | | | |
|---|---|---|---|
| 6,056,108 A | 5/2000 | Buchi et al. | |
| 8,402,860 B2 * | 3/2013 | Mizuno | B25J 9/1045 74/490.01 |
| 2008/0253612 A1 * | 10/2008 | Reyier | B25J 9/1697 382/103 |
| 2011/0223000 A1 * | 9/2011 | Martinez et al. | 414/730 |

FOREIGN PATENT DOCUMENTS

| | | |
|---|---|---|
| DE | 2749603 A1 | 9/1979 |
| DE | 102004021000 B4 | 3/2006 |

(Continued)

OTHER PUBLICATIONS

Mattern, Thomas, "Apparatus for the Automated Removal of Workpieces Arranged in a Container," U.S. Appl. No. 13/929,637, filed Jun. 27, 2013, 73 pages.

(Continued)

*Primary Examiner* — Yolanda Cumbess
(74) *Attorney, Agent, or Firm* — Alleman Hall McCoy Russell & Tuttle LLP

(57) ABSTRACT

An apparatus for the automated handling of workpieces comprising an object recognition device for detecting the workpiece and a gripper arranged at a gripping arm for picking the workpieces and a control for evaluating the data of the object recognition device, for track planning and for controlling the gripping arm and the gripper and comprising a compensation unit which allows an evasion movement of the gripper, wherein the compensation unit only allows an evasion movement of the gripper on the exceeding of a predefined first load of the gripping arm and remains rigid below the first load, wherein the first load is larger than a load exerted on the gripping arm solely by the gripper and/or the picked workpiece.

22 Claims, 25 Drawing Sheets

(56) References Cited

FOREIGN PATENT DOCUMENTS

| DE | 102009021538 A1 | 11/2010 |
|---|---|---|
| DE | 102010022988 A1 | 1/2011 |
| EP | 0139307 A3 | 5/1985 |
| JP | 2010005769 A | 1/2010 |
| JP | 2011000685 A | 1/2011 |
| WO | 2010024794 A1 | 3/2010 |

OTHER PUBLICATIONS

Mattern, Thomas, "Apparatus for the Automated Detection and Removal of Workpieces," U.S. Appl. No. 13/929,643, filed Jun. 27, 2013, 68 pages.

Mattern, Thomas, "Apparatus for the Automated Handling of Workpieces," U.S. Appl. No. 13/929,647, filed Jun. 27, 2013, 68 pages.

* cited by examiner

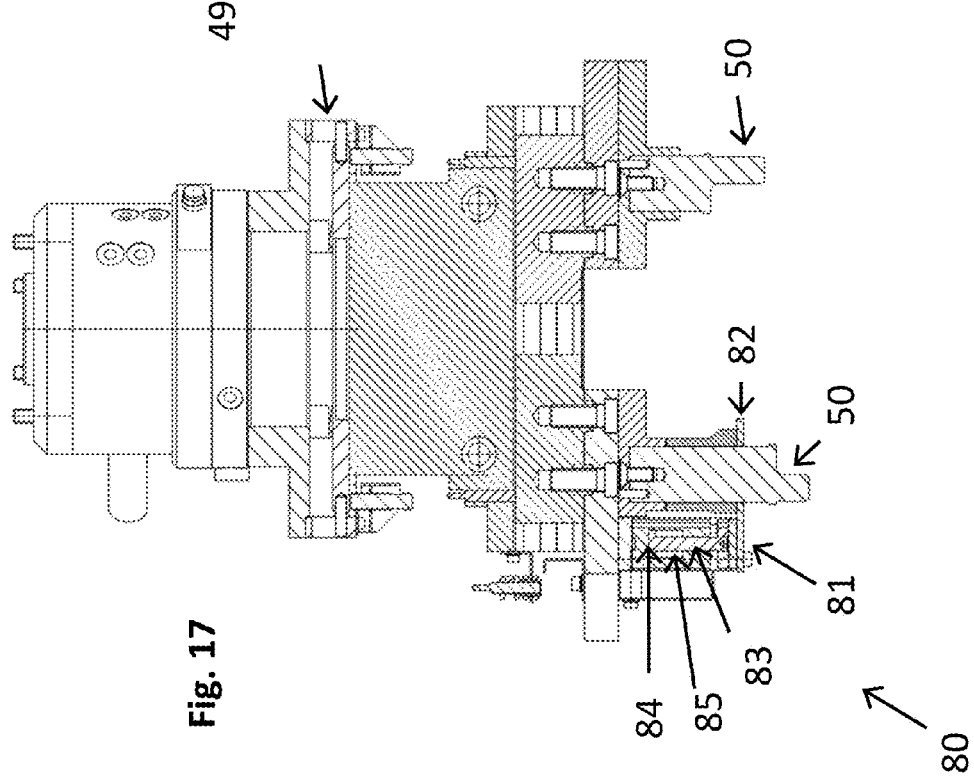

APPARATUS FOR THE AUTOMATED HANDLING OF WORKPIECES

CROSS-REFERENCE TO RELATED APPLICATIONS

This application claims priority to German Patent Application No. 10 2012 012 988.2, entitled "Apparatus for the Automated Handling of Workpieces," filed Jun. 29, 2012, and also claims priority to European Patent Application No. 13 003 099.2 entitled "Apparatus for the Automated Handling of Workpieces," filed Jun. 18, 2013, both of which are hereby incorporated by reference in their entirety for all purposes.

TECHNICAL FIELD

The present invention relates to an apparatus for the automated handling of workpieces comprising an object recognition device for detecting the workpieces and a gripper arranged in a gripping arm for picking the workpieces and a control for evaluating the data of the object recognition device for track planning and for controlling the gripping arm and the gripper and comprising a compensation unit which allows an evasion movement of the gripper.

BACKGROUND AND SUMMARY

Such an apparatus for so-called "bin picking" is known from WO 2010/024794 A1. In this apparatus, a resilient element is arranged between the gripping arm and the gripper as a compensation unit which allows a certain movement of the gripper on a load on the gripper due to a collision, for example. In this respect, a control is provided which measures and/or controls the elastic deformation of this element.

The resilience of the element between the gripping arm and the gripper is in this respect intended to make it possible that on an inaccurate traveling of the gripper toward a workpiece, the gripper is deflected on the basis of the collision with the workpiece such that it can still pick the workpiece. Only when a certain deformation of the resilient element is exceeded should the picking procedure be stopped.

It is disadvantageous in this arrangement that a deformation of the resilient element not only takes place on a collision with an interfering edge, but also due to the gripper's and/or the workpiece's own weight so that the exact position of the gripper depends on the deformation of the resilient element and can therefore only be determined with difficulty. The position of the gripper can in this respect in particular only be determined by an accurate measurement of the deformation of the resilient element. An exact monitoring of the deformation is furthermore also necessary for the decision whether the picking procedure should be stopped. In addition, the arrangement is prone to problems.

It is therefore the object of the present invention to provide an improved apparatus for the automated handling of workpieces.

This object is achieved in accordance with the invention by an apparatus in accordance with claim 1. Advantageous embodiments of the invention form the subject of the dependent claims.

The apparatus in accordance with the invention for the automated handling of workpieces comprises an object recognition device for detecting the workpieces, a gripper arranged at a gripping arm for picking the workpieces and a control for evaluating the data of the object recognition device, for track planning and for controlling the gripping arm and the gripper. The control can in this respect in particular comprise an evaluation device for evaluating the data, a track planning module for track planning and a control unit for controlling the gripper. A compensation unit is furthermore provided which allows an evasion movement of the gripper. In accordance with the invention, the compensation unit, however, only allows an evasion movement of the gripper on an exceeding of a predefined first load on the gripping arm, while it remains rigid below the first load. In accordance with the invention, the first load is in this respect larger than a load exerted on the gripping arm only by the gripper and/or by the picked workpiece. In accordance with the present invention, in particular no evasion movement of the compensation unit thus takes place despite the load on the gripping arm by the gripper's and, where applicable, the workpiece's own weight.

It is therefore ensured by the compensation unit in accordance with the invention and unlike by the resilient element used in the prior art that the gripper adopts a defined position with respect to the gripping arm in normal operation. The position of the gripper in normal operation is hereby unambiguously defined so that a secure and accurate moving of the gripper via the gripping arm becomes possible.

The first load is in particular selected so high that this load limit can only occur, at least in a travel position of the gripper, by a collision of the gripper with an interfering edge such as the workpiece to be picked and/or another workpiece and/or a side wall of a container.

The apparatus in accordance with the invention can in this respect in particular serve the removal of workpieces randomly arranged in the container since the position of the workpieces can be determined by a suitable object recognition device and therefore does not have to be known in advance. The apparatus can naturally, however, also be used when the workpieces are already present with a certain order in the container.

In accordance with the invention, any desired system which allows the identification of the workpieces and the selection of a workpiece suitable for picking can be used as an object recognition device for detecting the workpieces.

The detection of the workpieces in this respect typically comprises a data logging by a measurement process. An identification of the individual workpieces in the detection zone from which a workpiece suitable for picking is selected then takes place by evaluating the data. The movement of the gripper or of the gripping arm moving it is planned on the basis of the positional data of this workpiece. In this respect, a collision check can be carried out so that a movement routine is selected in which the gripper or the gripping arm does not collide with interfering edges such as the other workpieces and/or the side walls of the container. The gripper or the gripping arm is then controlled using the data thus calculated.

In this respect, in particular optical sensors are used as the object recognition device, with in particular laser sensors and/or image sensors being able to be used. The sensors can in this respect work two-dimensionally, two-and-half-dimensionally and three-dimensionally. A 3D laser scanner is particularly preferably used in this respect.

A sensor arrangement is furthermore advantageously provided which recognizes an evasion movement of the compensation unit occurring due to a collision on an exceeding of the first load.

The sensor arrangement can in this respect, for example, comprise a contact sensor and/or an optical sensor.

Further advantageously, a predefined travel path of the gripping arm is permitted on detecting a collision. The picking procedure is hereby not interrupted, for example, when the gripper comes into contact with the workpiece to be picked.

In this respect, the picking position of the gripper can be calculated so that no direct contact usually arises between the gripper and the workpiece by the traveling of the gripper toward the workpiece. The still permitted travel path in this case secures the system against an unnecessary stop if a collision does still occur, for example due to inaccuracies in the detection of the workpiece or in the control of the gripping arm.

Provision can alternatively be made that the picking position is calculated so that a direct contact between the gripper and the workpiece arises by the traveling of the gripper toward the workpiece. The detection of the collision thus allows a check as to whether the gripper was traveled into the correct position.

Provision can furthermore be made that the gripper is traveled toward a workpiece for so long until a collision is detected.

Irrespective of the manner of the traveling of the gripper toward a workpiece, the gripper can be moved back again after the picking up of the workpiece initially on the same path with which it was traveled toward the workpiece. Since this path has not produced any collisions on the traveling, the probability that no collisions will also arise on the traveling back is particularly high in this respect.

Furthermore, in a possible embodiment, the data of the sensor of the compensation unit can remain out of consideration for a certain travel path on the lifting of the workpiece so that a deflection of the compensation unit in this region is not evaluated as a collision. It can hereby in particular be avoided that dynamic and/or static loads on the picking up of the workpiece, which result in a deflection of the compensation unit, are erroneously evaluated as a collision.

Provision can furthermore be made in accordance with the invention that individual portions of the gripping arm movement are carried out at different speeds. The gripping arm can in particular be traveled at a lower speed in regions in which a collision has to be expected than in regions in which a collision does not have to be expected.

The gripping arm is in this respect advantageously traveled at a first speed for so long as the gripper is located outside the container for the workpieces and at at least one second, lower speed for so long as the gripper is located within the container. Further advantageously, the gripper is furthermore traveled at a third, still lower speed in a near region to the workpieces and/or interfering edges. The gripper can in this respect in particular be traveled a certain path distance at the third speed before a picking procedure takes place or before the gripper is traveled to the workpiece.

As already described above, the picking procedure does not have to be directly stopped in accordance with the invention when a compensation movement of the compensation unit was detected. The picking procedure can rather utilize the compensation path of the compensation unit in order also to be able to carry out a further movement after the detection of a compensation movement.

This compensation path can furthermore be utilized to brake the gripping arm in good time before the total compensation path of the compensation unit was used up despite corresponding processing times and control times.

The picking procedure is in this respect advantageously stopped and restarted on the exceeding of a permitted travel path which corresponds to a second load of the gripping arm.

If, in contrast, it is detected that a collision is no longer present before the permitted travel path was exceeded, the operation can be continued without interruption.

In this respect, in accordance with the invention, the magnitude of the evasion movement does not have to be known to initiate a reaction to a collision. The travel path from the detection of the collision known from the control of the gripping arm is rather utilized for this purpose. A monitoring of the deformation of the compensation unit is thus not necessary in accordance with the invention.

The adjustment path of the gripping arm which the control allows after the detection of a collision is advantageously smaller than the compensation path of the compensation unit. It is hereby ensured that on a movement of the gripping arm in the permitted adjustment region, the forces occurring by the collision are taken up by the compensation unit.

On the determination of the permitted travel path, the processing time of the control and the reaction times of the drives of the gripping arms can be taken into account in this respect to ensure a braking in good time within the compensation path of the compensation unit.

The control in this respect advantageously has an overload function which intervenes on the exceeding of a predefined third load of the gripping arm, with the third load being larger than the first and/or second loads. The overload function can in this respect in particular be the overload function of a robot arm. Provision can furthermore be made that the overload function works with reference to the monitoring of the load of the drives of the gripping arm. Provision can furthermore be made that the overload function caries out an emergency stop on recognition of an overload so that the gripping arm can only be released again by a manual user intervention.

The compensation unit in accordance with the invention now prevents such a high load acting on the gripping arm that the overload function intervenes. In particular only a travel path is permitted on detection of a compensation movement and thus of a collision of the gripper with an interfering edge by which the load does not increase beyond the first load.

The gripper is advantageously moved back into a neutral position on the exceeding of the permitted travel path and the picking procedure is restarted. In this respect, in particular a repeat detection of the workpieces to be picked can take place before a workpiece is again picked.

The traveling back of the gripper after the detection of a collision can in this respect first take place on the reverse path with which the gripper was moved up to the collision.

The sensor arrangement of the compensation unit can also be configured such that the direction of a compensation movement is recognized. The control advantageously takes account of this direction of the compensation movement thus recognized on the retraction of the gripper. It can in particular thus be prevented that the load of the gripping arm increases by the retraction.

The apparatus in accordance with the invention can furthermore have a force torque sensor arrangement arranged separately from the compensation unit at the gripping arm for measuring the load of the gripping arm. This combination of compensation unit and force torque sensor arrangement thus allows an exact monitoring of the load of the gripping arm and nevertheless ensures by the rigid design of the compensation unit in accordance with the invention that a defined position of the gripper is present at the gripping arm in normal operation.

In a further embodiment, the apparatus in accordance with the invention can comprise two compensation units connected in series. This in particular makes it possible to increase the compensation path provided by the compensation units.

The first compensation unit is in this respect advantageously a compensation unit having a spherical compensation movement, while the second compensation unit is a compensation unit having a linear compensation movement. The protective function against loads in any directions provided by the spherical compensation unit can hereby be combined with a large compensation path provided by the linear compensation unit.

Provision can furthermore be made that the two compensation units are preloaded via separate preload means. The loads at which the two compensation units deflect can hereby be separately determined.

Provision can further preferably be made that the two compensation units deflect at different loads of the gripping arm. Provision can in this respect in particular be made that the linear compensation unit only deflects when the spherical compensation unit has already previously deflected.

In this respect, the sensor arrangement which detects a deflection of the compensation unit is advantageously arranged at the compensation unit which deflects on the lower load of the gripping arm and/or at the compensation unit having a spherical compensation movement.

The sensor unit for recognizing the deflection of the compensation unit can further preferably only detect the deflection movement of one of the two compensation units, while a compensation movement of the other compensation unit is not monitored.

In this respect, different possibilities result in dependence on the application for the configuration of the first load of the gripping arm at which the compensation unit or, on the use of a plurality of compensation units, at which the first compensation unit deflects:

On the one hand, the compensation unit can be configured so that the first load at which it deflects is larger than the static loads which are exerted on the compensation unit independently of the position and orientation of the gripper by the gripper as well as a by a workpiece arranged at the gripper. The compensation unit can optionally also be set so that dynamic loads, for example on the starting or accelerating of the gripper, also do not result in a deflection of the compensation unit. It is hereby ensured that the compensation unit actually only triggers on collisions.

However, such a configuration is not always possible, in particular with heavy grippers and/or workpieces and/or with loads in normal operation which come relatively close to the maximum permitted load of the gripping arm.

Alternatively, the compensation unit can therefore also be configured such that it admittedly remains rigid without a picked up workpiece independently of the position and orientation of the gripper, but optionally also deflects without a collision with a picked up workpiece and/or on dynamic loads.

The control of the apparatus in accordance with the invention is in this case preferably configured such that a deflection of the compensation unit is not necessarily evaluated as a collision. The control is further preferably designed such that static loads of the gripper after the picking up of the workpiece are reduced within a predefined travel path.

In this respect, the control can be designed so that the gripper changes the orientation of the gripper after the picking up of a workpiece with a slanted gripper such that the static forces are reduced which are exerted on the compensation unit by the gripper's own weight and by the weight of the workpiece. The present invention in this respect makes use of the recognition that the maximum static forces on the compensation unit occur at a position of the gripper in which it is deflected to the side by 90° and becomes lower with smaller deflections with respect to the vertical. An oblique orientation of the gripper can in this respect be necessary on the picking up of the workpiece. After the lifting of the workpiece, however, it is possible as a rule to move the gripper back in the direction of the vertical to reduce the static loads.

The gripper is therefore advantageously directed downwardly into a travel position after the picking up of a workpiece and is in particular oriented in the vertical direction. The gripper in this respect advantageously remains in the travel position during the travel path with which the workpiece is removed and placed down elsewhere.

The change in the orientation in this respect advantageously takes place on the lifting of the workpiece. In this respect, in particular with an obliquely aligned gripper, the travel movement of the gripper on the lifting of the workpiece can correspond to the travel movement of the gripper toward the workpiece and can be superimposed with the pivot movement by which the gripper is rotated in the travel position. In this respect, in particular the traveling toward the workpiece or the lifting of the workpiece takes place in the direction of the orientation of the gripper on picking.

Provision is advantageously made in this respect that the deflection of the compensation unit on the lifting is not evaluated as a collision. It is hereby prevented that a deflection is erroneously evaluated as a collision due to the static and/or dynamic loads which arise on the lifting. In this respect, the signal of the sensor of the compensation unit in a certain travel region after the start of the lifting of the workpiece is advantageously not taken into account.

In accordance with the invention, a compensation unit having two compensation units connected in series, as was described above, is particularly preferably used with a magnetic and/or pneumatic gripper. Such a compensation unit can, however, also be used with a mechanical gripper.

In a further aspect, the present invention comprises an apparatus for the automated removal of workpieces arranged in a container comprising an object recognition device for detecting the workpieces and a gripper arranged at a gripping arm for picking and removing the workpieces from the container as well as a control for evaluating the data of the object recognition device, for track planning and for controlling the gripping arm and the gripper. In accordance with the invention, the gripper is a magnetic and/or pneumatic gripper in this respect.

This embodiment of the gripper in accordance with the invention has the advantage that the gripper allows larger tolerances on the movement of the gripper into a picking position relative to the workpiece. In this respect, in particular a plurality of positions can be suitable for picking a workpiece so that the workpieces can be picked more securely.

In this respect, an object recognition device can be used as the object recognition device for detecting the workpieces such as was already described above with respect to the object recognition device for detecting the workpieces in the previously described aspect of the present invention.

The evaluation of the data, identification and selection of the workpieces, the track planning and the control of the gripper of the positioning apparatus can also take place in a similar manner as has been represented above with respect to the corresponding steps.

The object recognition device for detecting the workpieces in the container is in this respect preferably arranged in its measurement position above the container.

In the selection of the workpiece to be picked, it can in particular be detected in this respect whether a workpiece was identified which can be picked with a predefined first relative position between the workpiece and the gripper.

Such a first relative position can in particular represent an ideal picking position between the workpiece and the gripper which comprises the fact with a magnetic gripper, for example, that the magnetic surface of the gripper overlaps ideally with the workpiece.

However, the case can arise with parts not lying on one another in order than none of the workpieces present in the container can be picked with such a first relative position. In accordance with the invention, the control can in this case select a workpiece which is picked with a second picking position, for example a not ideal picking position. With a magnetic gripper, for example, a certain offset can be allowed in this respect between the magnetic gripping surface and the workpiece. A picking position rotated by an angle with respect to the ideal magnetic picking position can likewise be considered as an alternative picking position with the magnetic gripper, for example having an angle offset of 90°. Alternatively, or also when this is not possible, a picking can be attempted at the highest point of the workpiece, for example. A plurality of alternative picking positions can in particular be provided which are used in the selection of the workpiece to be picked.

Provision can alternatively or additionally be made that the gripper is controlled in accordance with the invention such that for the case it cannot pick up a workpiece with a first position calculated for picking, it repeats the picking with a second, changed position.

Provision can in particular also be made here to pick a workpiece to be picked with an offset or at its highest position when a sufficient cover cannot be achieved between the gripping surface of the gripper and a main surface of the workpiece.

However, it cannot be ensured with a magnetic or pneumatic gripper that the gripper actually only picks up a single workpiece. The case can in particular namely occur with the magnetic gripper that the gripper picks up two or even more workpieces.

The apparatus in accordance with the invention can furthermore have a force torque sensor arrangement for measuring the load of the gripping arm. The force torque sensor arrangement can in this respect in particular be arranged at the gripping arm separately from an above-described compensation unit.

The control can in this respect recognize by an evaluation of the data of the force torque sensor arrangement whether and how many workpieces can be picked up. The weight of a workpiece or the loads exerted on the force torque sensor arrangement in normal operation by this weight are in particular stored in the control for this purpose and can thus be compared with the loads actually occurring on the picking of a workpiece. Alternatively, the determination whether and how many workpieces were picked up can also takes place by the monitoring of the gripping force and/or of the current or power required to operate the gripper, in particular with a magnetic gripper.

Provision can be made in this respect that the control reduces the gripping force of the gripper when, for example, it is recognized via the data of the force torque sensor arrangement that more than one workpiece was picked up. The magnetic and/or pneumatic gripper also has the advantage in this respect that the gripping force can be set flexibly. In this respect, in particular with the magnetic gripper, the power of the griper electromagnet can be reduced. An attempt can be made by the reduction of the gripping force in this respect to drop the excess workpieces from the gripper again. In this respect, the gripping force can advantageously be reduced for so long until it is recognized with reference to the data of the force torque sensor arrangement that only a certain number of workpieces, and preferably only one workpiece, was picked up at the gripper.

Furthermore, the picking procedure can in particular be repeated using the data of the force torque sensor arrangement when it is recognized that no workpiece was picked up on a picking procedure.

The apparatus in accordance with the just described second aspect of the present invention, in which a magnetic and/or pneumatic gripper is used, can in this respect preferably be combined with the first described aspect of the present invention, i.e. with a compensation unit in accordance with the invention.

The demands on the delivery accuracy or the gripper to a workpiece can hereby be kept small and the load of the gripping arm, which is unwanted on a collision which nevertheless occurs, and/or the necessity of a manual intervention can be avoided.

The two aspects of the present invention can in this case each be used on their own or also combined with an apparatus in which the gripper removes the workpieces from a container and places them on an intermediate station from where the workpieces are positioned more accurately and/or are singularized via a positioning apparatus. This is in particular of particular advantage when a magnetic and/or pneumatic gripper is used since it does not allow any accurate positioning of the workpieces at a target receiver.

In this case, an embodiment is preferably used having two compensation units connected in series, in particular a two-stage compensation unit such as was described above.

A gripper in accordance with the first aspect of the present invention having a compensation unit in accordance with the invention can, however, also be used in accordance with the invention as a positioning apparatus for the more accurate positioning of a workpiece, starting from an intermediate station. In this respect, a mechanical gripper can in particular also be used.

In this case, an embodiment is preferably used having only one compensation unit, in particular having a spherically working compensation unit such as was described above.

The workpiece can advantageously be removed from the container by a first gripper and placed down on the intermediate station, with the workpiece advantageously being dropped onto the intermediate station from a certain height. A slanted plane can in particular be provided in this respect onto which the workpieces are dropped. The workpieces can in this respect slide to a further transport position on this slanted plane.

Furthermore, a transport device can be provided on the intermediate station which transports the workpieces from a placing region to a removal region. The positioning apparatus advantageously removes the workpieces in the removal region by the positioning apparatus in this respect, with a gripper, in particular a mechanical gripper, advantageously being provided for picking the workpieces in the removal region.

In this respect, a repeat detection of the workpieces advantageously takes place on the intermediate station by which detection the positioning apparatus, and in particular a gripper of the positioning apparatus, can be controlled. In this respect, in particular an object recognition device for detecting the workpieces is arranged in the removal region.

In accordance with the invention, the workpieces can thus be placed randomly arranged on the intermediate station and can nevertheless be accurately picked due to the repeat detection.

The present invention furthermore comprises a compensation unit having a base unit and a compensation plate which is engaged around by a holding region of the base unit and is preloaded toward the base unit and in particular the holding region via a spring arrangement so that the compensation unit only allows an evasion movement between the base unit and the compensation plate on an exceeding of a predefined first load and remains rigid under the first load.

Such a compensation unit can in this respect in particular be used between a gripping arm and a gripper in accordance with the invention in order, as described above, to prevent an overload of the gripping arm on a collision of the gripper with an interfering edge.

The compensation unit is in this respect preferably configured and is used as was described in more detail above with respect to the apparatus.

Further advantageously, one or more sensors are provided, in particular in the holding region, which monitor the lying of the compensation plate at the holding region. In this respect, it can, for example, be one or more contact sensors and/or optical sensors. The sensors can thus recognize whether the compensation unit carries out a compensation unit since the first load was exceeded or whether the compensation unit is rigid. In this respect a plurality of sensors can preferably be provided so that the direction of the compensation movement can be recognized.

The compensation plate is round in a preferred embodiment. This allows a compensation movement in all directions by a slanted position of the compensation plate. Further advantageously, a margin of the compensation plate is rounded to prevent a canting of the compensation plate.

Further advantageously, the compensation plate is arranged non-rotatably at the base unit in order hereby to prevent rotational movements of the compensation plate.

The movement between the base unit and the compensation unit can in this respect in particular allow a spherical compensation movement.

In a preferred embodiment, the compensation unit further comprises a second compensation unit which allows a linear compensation movement.

Provision can be made in this respect that the two compensation units are preloaded via separate preload means. Provision can further be made that the two compensation units deflect at different loads of the gripping arm.

The second compensation unit can in this respect in a possible embodiment have one or more bars which are linearly guided in a guide and are preloaded via a spring.

In this respect, the spherical compensation unit and the linear compensation unit are advantageously connected in series.

Further advantageously, the spherically working compensation unit deflects first and only then the linearly acting compensation unit.

The present invention furthermore comprises a method for operating an apparatus for the automated handling of workpieces which has an object recognition device for detecting the workpieces and a gripper arranged at a gripping arm for picking the workpieces as well as a control for evaluating the data of the object recognition device, for track planning and for controlling the gripper arm and the gripper as well as a compensation unit which only allows an evasion movement of the gripper on an exceeding of a first load of the gripping arm. In accordance with the invention, the first load is in this respect selected larger than the forces occurring in the normal operation of the gripper, with the compensation unit remaining rigid under the first load so that evasion movements of the gripper are prevented in normal operation. The first load can in this respect in particular be selected as larger than the load exerted on the gripping arm only by the gripper and/or by the picked workpiece.

It is ensured by the method in accordance with the invention that in normal operation an unambiguous positional relationship is present between the gripper and the gripping arm and evasion movements of the gripper only occur on a collision.

In this respect, in accordance with the method in accordance with the invention a collision is advantageously recognized by the detection of an evasion movement and the still permitted travel path on the detection of a collision is restricted. If this travel path is also exceeded, the picking procedure is stopped and restarted.

The method in accordance with the invention is advantageously carried out in this respect as has already been described in more detail above with respect to the apparatus in accordance with the invention. The method in accordance with the invention in particular serves in this respect the operation of an apparatus as was described above.

Provision can furthermore be provided that the orientation of the gripper is changed after the picking up of a workpiece with a slanted gripper such that the static forces acting on the compensation unit due to the gripper's own weight and the weight of the workpiece are reduced. The gripper is in this respect preferably oriented in a travel position into which it is oriented downwardly, and in particular downwardly in a vertical direction.

The change in the orientation in this respect advantageously takes place on the lifting of the workpiece. Further preferably, the deflection of the sensor on lifting is not evaluated as a collision.

The present invention further comprises a method for operating an apparatus for the automated removal of workpieces arranged in a container comprising an object recognition device for detecting the workpieces and a gripper arranged at a gripping arm for picking and removing the workpieces from the container as well as a control for evaluating the data of the object recognition device, for track planning and for controlling the gripping arm and the gripper. Provision is made in this respect in accordance with the invention that the workpieces are picked magnetically and/or pneumatically.

The load of the gripping arm can advantageously be measured in this respect. Provision can in particular be made in this respect that the gripping force of the gripper is reduced when it is recognized that more than one workpiece is picked up.

The method in accordance with the invention can furthermore take place as has already been described above with respect to the apparatus in accordance with the invention. The method in accordance with the invention in particular serves in this respect the operation of an apparatus as was described above.

The present invention furthermore comprises a computer program for carrying out one of the methods which were described above. The computer program in particular comprises commands for this purpose which implement the method on an apparatus for the automated handling of workpieces arranged randomly. The computer program in accordance with the invention can in this respect in particular be used for implementing a control for an apparatus as was described above.

All the steps in the handling of the workpieces advantageously take place by the method in accordance with the invention and/or by the apparatus in accordance with the invention in a fully automated manner and without a user intervention being necessary.

The subject of the present invention will now be described in more detail with reference to embodiments and to drawings.

BRIEF DESCRIPTION OF THE FIGURES

FIG. 4b shows an alternative embodiment of a transport path as can be used on the intermediate station in the embodiment shown in FIG. 4a.

FIG. 5 shows a first gripper of the embodiment shown in FIG. 4a.

FIG. 7 shows a second gripper of the embodiment shown in FIG. 4a.

FIG. 8 shows an embodiment of a travelable object recognition device as can be used in the embodiment shown in FIG. 4a.

FIG. 17 shows a sectional view through the embodiment of a gripper shown in FIG. 16.

DETAILED DESCRIPTION

Embodiments of apparatus for the automated handling of workpieces will be presented in the following in which the present invention is used.

The individual embodiments in this respect in particular serve the fully automatic singularization and/or positioning of workpieces. In this respect, any desired elements can be handled as workpieces, in particular also asymmetrical workpieces beside workpieces with one or more planes or symmetry or axes of symmetry. Furthermore, workpieces can be handled in this respect which only have one gripping point or workpieces having a plurality of gripping points. The apparatus in accordance with the invention can in this respect in particular be used for handling metal workpieces. The workpieces can, however, naturally comprise any desired materials and in particular also plastic. The workpieces can furthermore also comprise a plurality of materials, for example a combination of plastic parts and metal parts.

In part in this respect, a gripper for picking the workpiece is combined with an object recognition device for detecting the workpieces so that the gripper can be controlled using the data determined by the object recognition device. Such apparatus in particular serve the automated handling of randomly arranged workpieces.

The object recognition device for detecting the workpieces can in this respect comprise any desired sensor whose data allow an object recognition of the workpieces. A laser scanner can in particular be used in this respect. Alternatively or additionally, the object recognition device can comprise one or more cameras. The object recognition device in this respect preferably allows a 3D object recognition. Alternatively, however, a 2D or 2.5D object recognition is conceivable.

Figure 1:
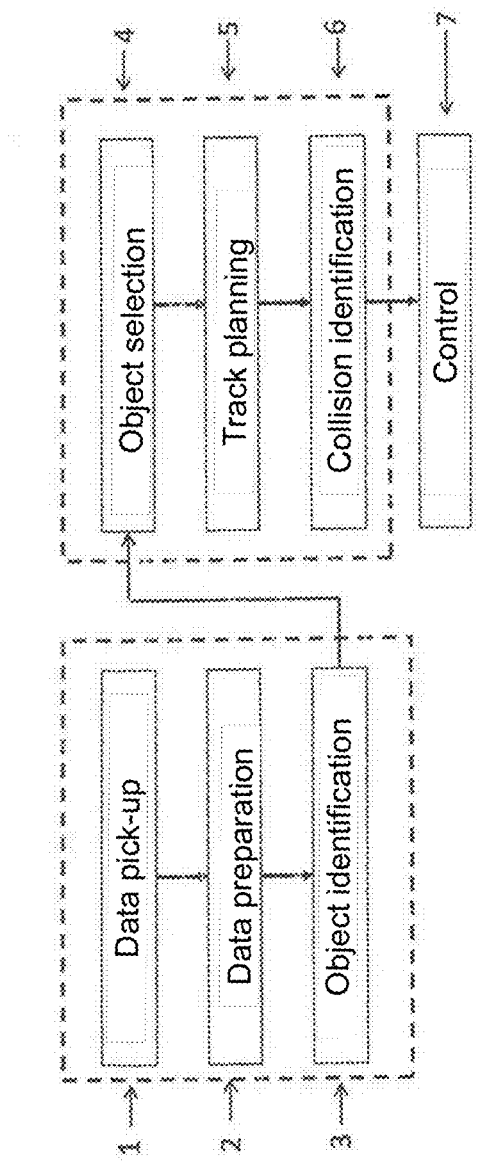
FIG. 1 shows a flowchart of a detection in accordance with the invention of workpieces and of a corresponding control of a gripper.

FIG. 1 shows the typical routine on the detection of randomly arranged workpieces and the corresponding control of a gripper. In step 1, a measurement is carried out by the object recognition device by which data is obtained. These data are processed in a step 2 to allow an identification of the individual workpieces in a step 3. Optionally, the object recognition device can, however, also work using already known positional data of the workpieces.

In step 4, a workpiece which can be picked by the gripper is selected from the identified workpieces. In step 5, the track for the gripper or for the gripping arm moving the gripper is calculated using the positional data of the selected workpiece. In step 6, this track is then checked for possible collisions with interfering edges to prevent collisions. If a collision-free track is found, it is used in step 7 for controlling the gripper, i.e. for traveling the gripper into a picking position toward the selected workpiece.

Such a method can in this respect always be used when a detection of the workpieces and a corresponding control of a gripper take place in accordance with the present invention.

The apparatus and methods in accordance with the invention can in this respect in particular serve the handling of randomly arranged workpieces since the position of the workpieces can be determined by a suitable object recognition device and therefore does not have to be known in advance. The present invention can naturally, however, also be used when the workpieces are already arranged in a certain order.

Any desired apparatus having a plurality of axes of movement can be used for moving the gripper and the gripper can be moved on a defined track and can be traveled toward the workpiece to be picked via the control of said axes of movement.

Figure 2:
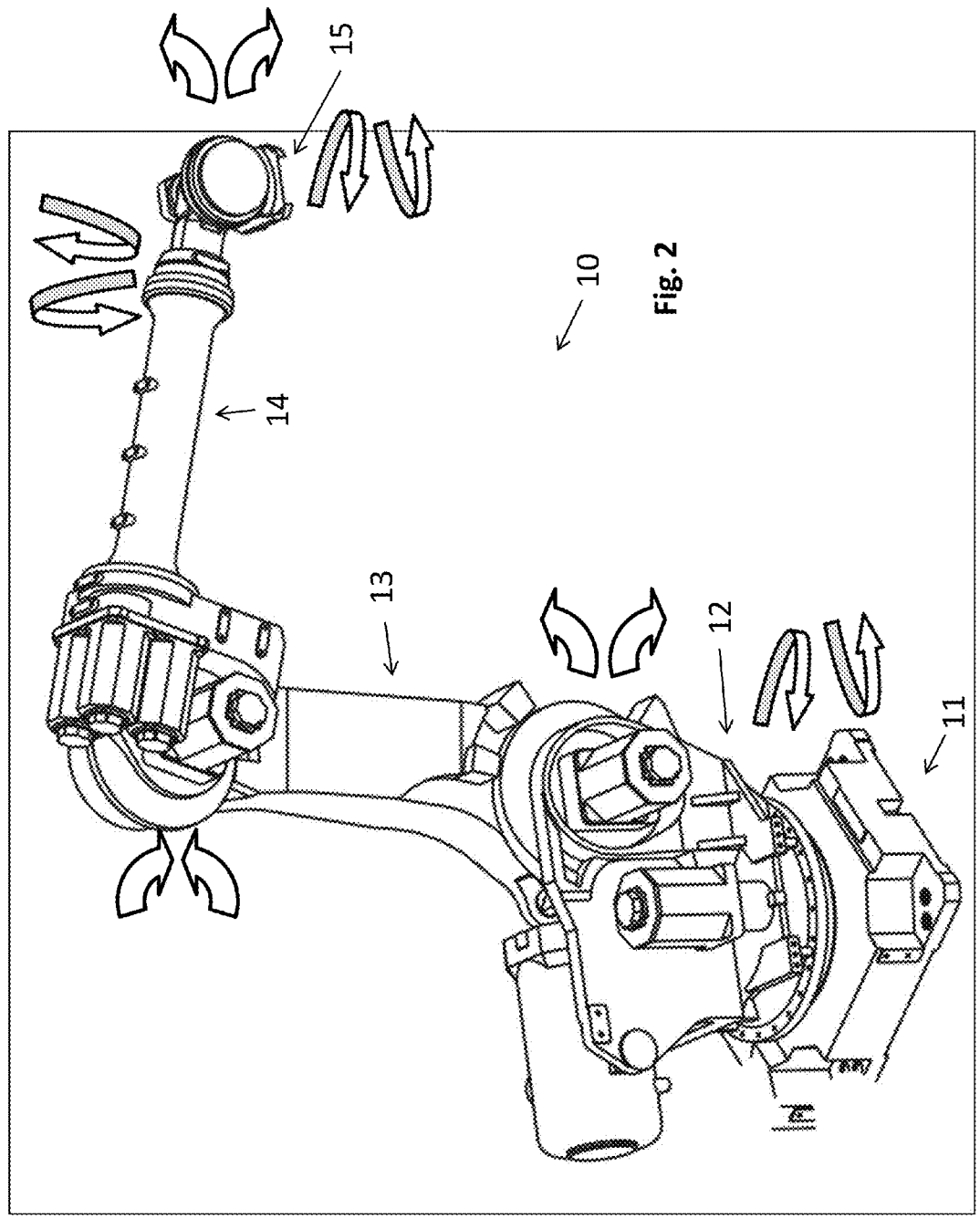
FIG. 2 shows a first embodiment of an apparatus which can be used for moving a gripper in accordance with the invention.

In FIG. 2, a first embodiment of such an apparatus for moving a gripper is shown, with it being a multiaxial robot 10. It is in this respect a six-axial robot in the embodiment. It comprises a base 11 on which a pedestal 12 is arranged rotatably about a vertical axis of rotation. A pivot arm is pivotably arranged about a horizontal pivot axis at the pedestal 12. A rotary arm 14 is arranged around a horizontal pivot axis at the pivot arm 13. The rotary arm 14 furthermore more has an axis of rotation which allows a rotation about an axis of rotation arranged in parallel with the rotary arm 14. A gripping arm 15 is arranged around a pivot axis arranged perpendicular to the axis of rotation of the rotary arm 14 at the rotary arm 14. The gripping arm has an axis of rotation which stands perpendicular on the pivot axis. In accordance with the invention, a gripper can be arranged at the gripping arm and can thus be moved and pivoted in space via the control of the axes of movement of the robot.

Figure 3:
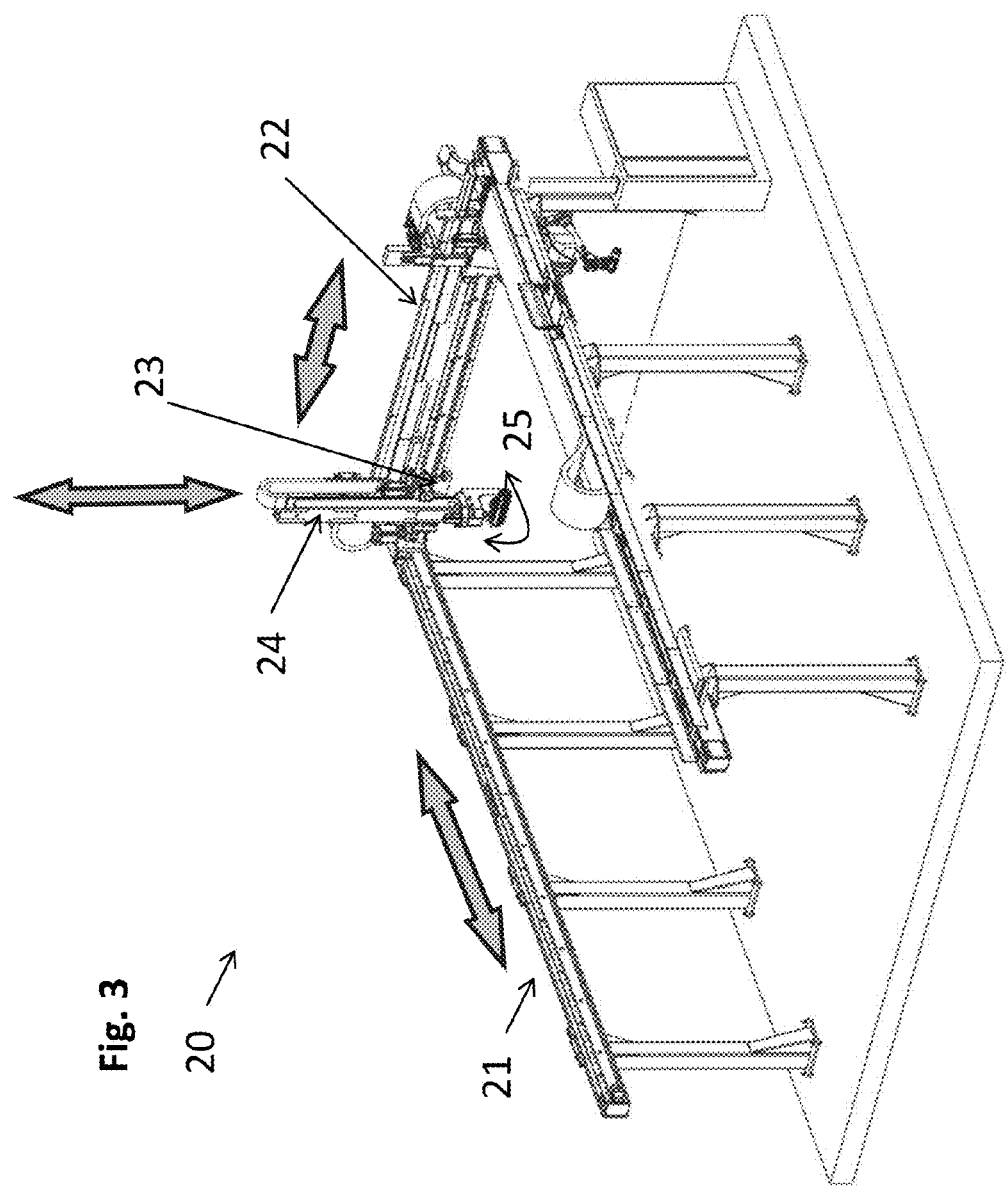
FIG. 3 shows a second embodiment of an apparatus which can be used for moving a gripper in accordance with the invention.

In FIG. 3, an alternative embodiment for an apparatus for moving a gripper is shown which can be used in all embodiments of the present invention instead of a robot. In this respect, it is a surface portal which has three linear axes of movement and is additionally equipped with a further axis of rotation. In this respect, portal rails 21 are provided at which a portal bar 22 is arranged in a linearly travelable manner. A slide 23 is likewise arranged in a linearly travelable manner at the portal bar 22. An arm is arranged travelable in the vertical direction at the slide 23. This arm is additionally equipped with an axis of rotation 25. The arm can in this respect have a gripper in accordance with the present invention at its lower end.

Figure 4A:
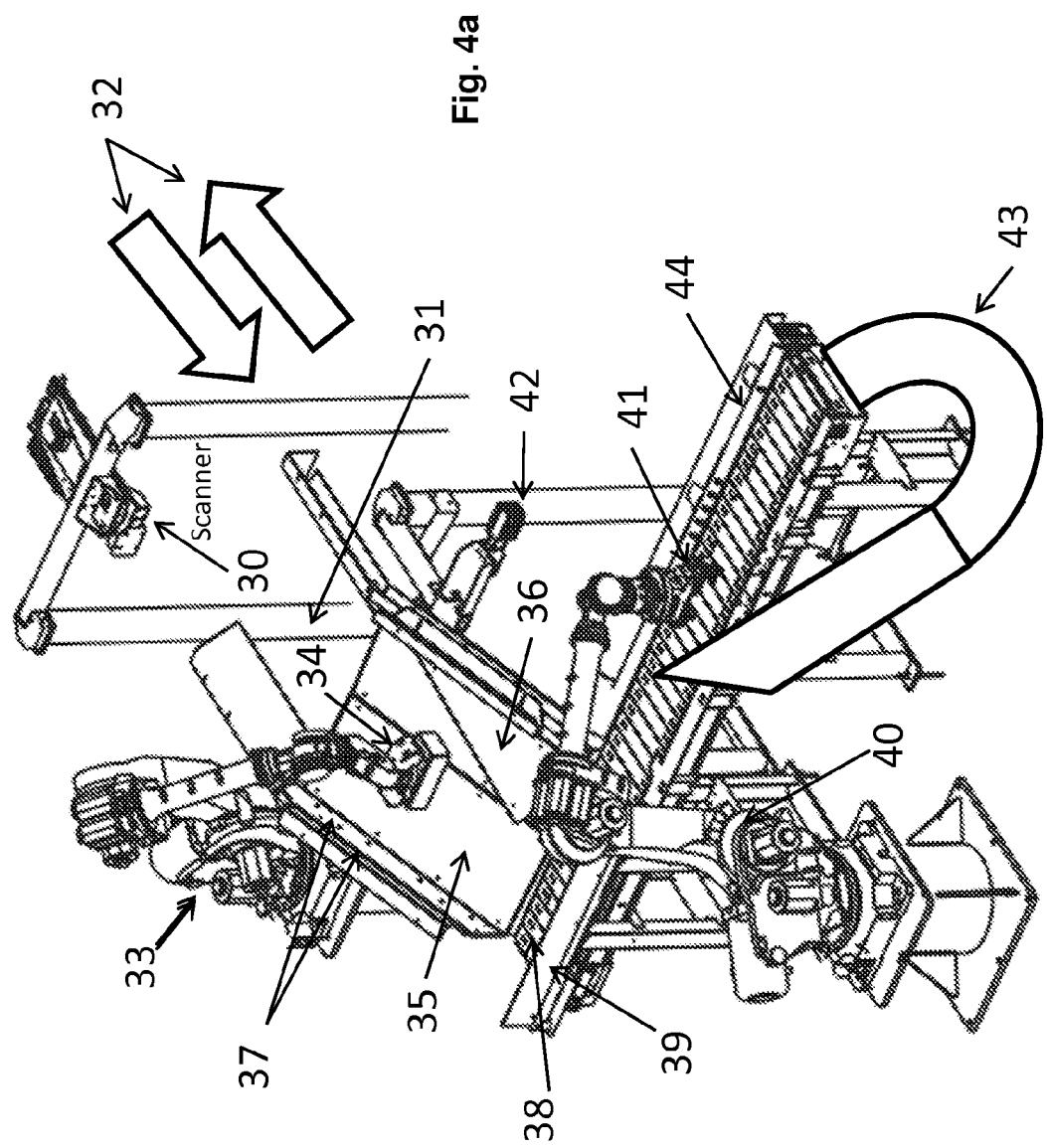
FIG. 4a shows a first embodiment of an apparatus in accordance with the invention for the automated removal of workpieces randomly arranged in a container.

In FIG. 4a, a first embodiment of an apparatus in accordance with the invention for the automated removal of workpieces is shown which combines an object recognition device 30 for detecting the workpieces with a first gripper 34 for picking the workpieces to remove the workpieces arranged randomly in a container from the container using the first gripper 34. In this respect, the workpieces are not arranged directly at a target receiver by the first gripper 34, but are rather placed down in a random arrangement on the intermediate station from where they are positioned more accurately via a second gripper 41.

The embodiment in this respect has a receiver 31 for a container, not shown, with workpieces randomly arranged therein. Furthermore, a channeling in and channeling out device 32 can be provided for such containers. The object recognition device 30 for detecting the workpieces in the container is provided above the container, not shown. Its data are evaluated as initially described such that the workpieces are gripped in the container via the first gripper 34 and can be removed from it. The first gripper 34 is in this respect moved via a robot 33 in the embodiment. Alternatively, a surface portion can also be used here.

In the embodiment, a magnetic gripper is used as the first gripper 34 since such a magnetic gripper makes less high demands on the delivery accuracy of the gripper to the workpiece and is therefore better suited actually to empty containers 100% having workpieces which are arranged chaotically in them and which moreover can be stacked over one another in random positions, as is possible in accordance with the embodiment of the present invention.

It is in particular possible with a magnetic gripper also to pick workpieces having a non-ideal picking position. In this respect, a certain offset can in particular be present between the gripping surface of the magnetic gripper and a main surface of the workpiece. In addition, a picking is optionally also possible when the magnetic gripper only engages at the highest point of a workpiece. If the control can therefore not identify any workpiece which can be ideally picked using the data of the object recognition device, that is with which an ideal superimposition of the gripping surface and a main surface of the workpiece is present, a picking with an offset or a picking at a highest point can alternatively be made use of. Such a picking can equally be made use of when another picking strategy did not result in the picking up of a part.

A pneumatic gripper could also be used alternatively to the magnetic gripper 34. It is equally conceivable to replace the magnetic gripper 34 shown in the embodiment in accordance with FIG. 4a by a mechanical gripper if the workpieces are shaped such that they can also be reliably picked in the container by a mechanical gripper.

The first object recognition device 30 can furthermore be used to recognize workpieces which arrived erroneously in the container. If a workpiece is detected in this respect which does not satisfy the required workpiece criteria and is therefore not to be positioned at a target receiver, this can be separated out, for example in that the workpiece is picked and is placed in a corresponding container.

In accordance with the embodiment, the workpieces are not arranged at a target receiver by the first gripper, but are rather placed on an intermediate station from where they are picked up again by the second gripper 41 and are then positioned more accurately. The placing down of the workpieces on the intermediate station can take place in a random arrangement in this respect. The workpieces can in this respect in particular be dropped by the gripper 34 from a predefined height onto a placing region 35 of the intermediate station. The placing region 35 is in this respect configured as a sloping plane from which the workpieces slide to a further transport zone.

The placing region 35 can have one or more height sensors which determine the height of a workpiece arranged at the gripper 34 above the placing region. In this respect, in particular a light barrier arrangement 37 can be provided which is arranged to the side of the slanted plane 35. If in this respect a workpiece arranged at the gripper 34 arrives in the region of the light barrier arrangement, this means that the workpiece is arranged at a certain height above the slanted plane 35. The gripper 34 thereupon drops the workpiece. This procedure has the advantage that the position of the workpieces at the gripper 34 does not have to be exactly known. Collisions of the gripper with the placing region are nevertheless prevented. Provision can in this respect in particular be made that the gripper 34 first moves in a horizontal direction into a position above the placing region 35 after the picking up of a workpiece from the container and then lowers it so far until the vertical sensor responds.

The intermediate station furthermore has a transport belt 38 which transports the workpieces from the placement region 35 on to a removal region 44.

The workpieces in this respect slide from the slanted plane onto the transport belt 38, with the slanted plan 35 being able to be bounded by lateral abutment regions 36 which narrow the slanted plane downwardly so that the workpieces are directed to a defined further transport region of the transport belt.

This further transport region is advantageously equipped with an occupation sensor 39. It can in this respect in particular be a light barrier arrangement which determines the height of the workpieces placed on the transport belt. If a plurality of workpieces are stacked above one another, the occupation sensor responds. In this case, the further loading of the intermediation station by the first gripper 34 is stopped until the occupation sensor again signals a sufficiently free further transport region.

The workpieces are transported on the transport belt 38 into the removal region 44 and are there picked by the second gripper 41 to be positioned more accurately or to be singularized. In this respect, a second object recognition device 42 is provided which detects the workpieces in the removal region, with the second gripper 41 being controlled with reference to the data of the second object recognition device. A robot 40 is in turn provided for moving the second gripper 41. Alternatively, a surface portal could also be made use of here.

The second object recognition device 42 is necessary for picking the workpieces since they lie in a random arrangement on the intermediate station or on the transport belt. The picking situation on the intermediate station is, however, substantially simpler than with the container since the workpieces are all arranged in the same plane, i.e. on the transport belt, at least in the vertical direction. In addition, the workpieces are already presingularized and so can be picked more easily. In addition, the workpieces have a defined distance from the object recognition device 42 so that it works more accurately.

The second object recognition device 42 can furthermore be used to recognize workpieces which arrived erroneously on the intermediate station. If in this respect a workpiece is detected on the intermediate station which does not satisfy the required workpiece criteria and is therefore not to be positioned at a target receiver, it can be separated out, for example in that the workpiece is picked and is placed into a corresponding container or in that it is not picked and transported via the transport belt further into a container.

Provision can be made in this respect that the second object recognition device allows a more accurate detection of the workpieces than the first object recognition device so that incorrect workpieces are reliably recognized on the intermediate station.

In accordance with the invention, a mechanical gripper 41 can therefore be used as the second gripper which admittedly makes higher demands on the delivery of the gripper to the workpiece, but also allows a substantially more exact picking and positioning of the workpieces. In the embodiment, the mechanical gripper is a finger gripper, in particular a two-finger gripper such as will be presented later.

The control of the transport belt is in this respect in communication with the object recognition device 42 and the control of the gripper 41. In this respect, the transport belt stops in each case when a detection of the workpieces and the following picking of a workpiece by the gripper 41 takes place. If, in contrast, there are no longer any workpieces in the removal region 44, the transport belt is moved on until workpieces are again located in the removal region 44. For this purpose, a light barrier arranged laterally at the transport belt in the removal region can optionally also be used for this purpose in addition to the data of the object recognition device.

The side walls of the transport belt 38 can be chamfered, as can be recognized in FIG. 4a. It is hereby prevented that workpieces remain in unfavorable positions directly at the side wall which do not allow any picking.

Provision can furthermore be made that a reorientation apparatus is provided transversely over the transport belt 38 which flips over unfavorably arranged workpieces and thus brings them into a better position for picking by the second gripper 41. For example, a flap, not shown, or an abutment bar can be provided for this purpose which are arranged above the transport belt 38. Such a reorientation apparatus can in particular be arranged between the further transport belt 38 and the removal region 44 of the transport belt.

In this respect, provision can be made in accordance with the invention that workpieces which cannot be picked at all by the gripper 41 fall into a collection container arranged at the end of the transport path 38. Alternatively, a peripheral transport belt 43 can be provided such as will be described in more detail later.

Alternatively to the transport belt which is used as the transport device in FIG. 4a, a number of other alternatives are available for the configuration of the transport device. The basic idea of the intermediate station is in this respect the design with a loading side and an unloading side, a transport device between the two sides and a further object recognition device over the removal side. The transport from one side to the other side can take place as follows, for example:

Driven transport device:
Linearly working transport device
Pusher, shuttle, slide, in particular driven by linear drives such as a pneumatic cylinder Transport belt
Circular
Round, segment table, circular store
Loop or circular belt
A plurality of planes above one another
From bottom to top
From top to bottom
Non-driven transport devices:
Slanted plane on which the workpieces slide down
Combination of the Above-Named Driven Transport Devices and/or Non-Driven Transport Devices The position of the workpiece is preferably changed during the transport to increase the removal accuracy (place down inaccurately, remove accurately). This can be achieved by end abutments, guide rails with chamfer, spring mechanisms, etc. The intermediate station can furthermore also be used as a transfer picking site.

Figure 4B:
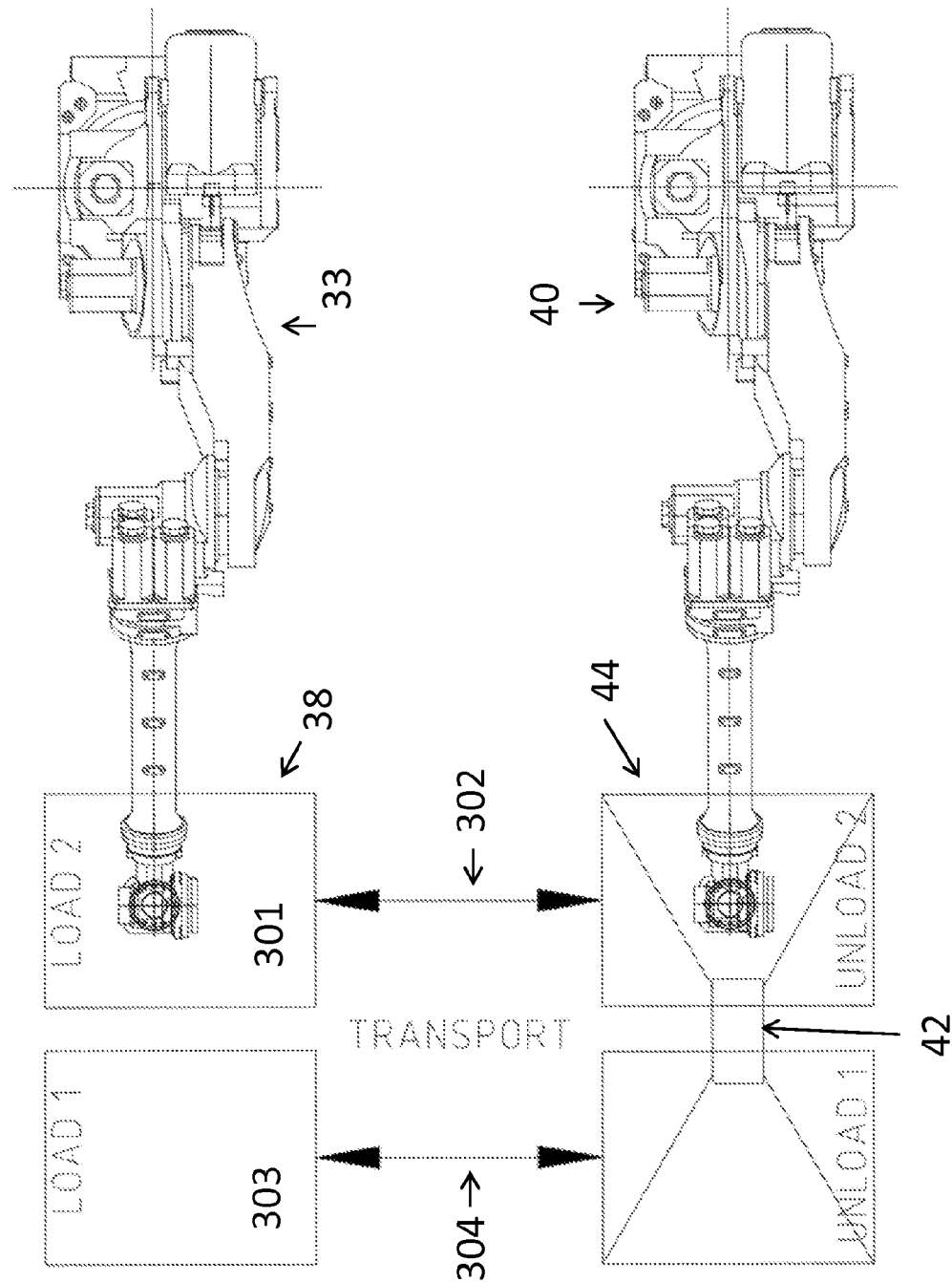

In this respect an alternative configuration of the transport device on the intermediate station is shown in FIG. 4b such as can be used in the embodiment shown in FIG. 4a. In the upper region, the first gripper 33 is shown which picks the workpieces from the container and places them in the placing region 38 on the intermediate station. In the lower region, the second gripper 40 is shown which removes the workpieces in the removal region 44. The second object recognition device 42 is furthermore shown which is arranged in the region of the removal region 44.

In this respect a first transport plate 301 is provided as the transport device which can be traveled from the placing region 38 to the removal region 44 and back via a linear drive 302 such as a pneumatic cylinder. In addition, a second transport plate 303 is provided which can likewise be traveled from the placing region 38 to the removal region 44 and back via the linear drive 304. The two transport plates and linear drives can be configured identically in this respect. The two transport devices can furthermore be arranged in parallel with one another. An empty transport plate is always available for loading or a filled transport plate for unloading through the embodiment with two transport plates so that the system can work without waiting times.

Figure 5:
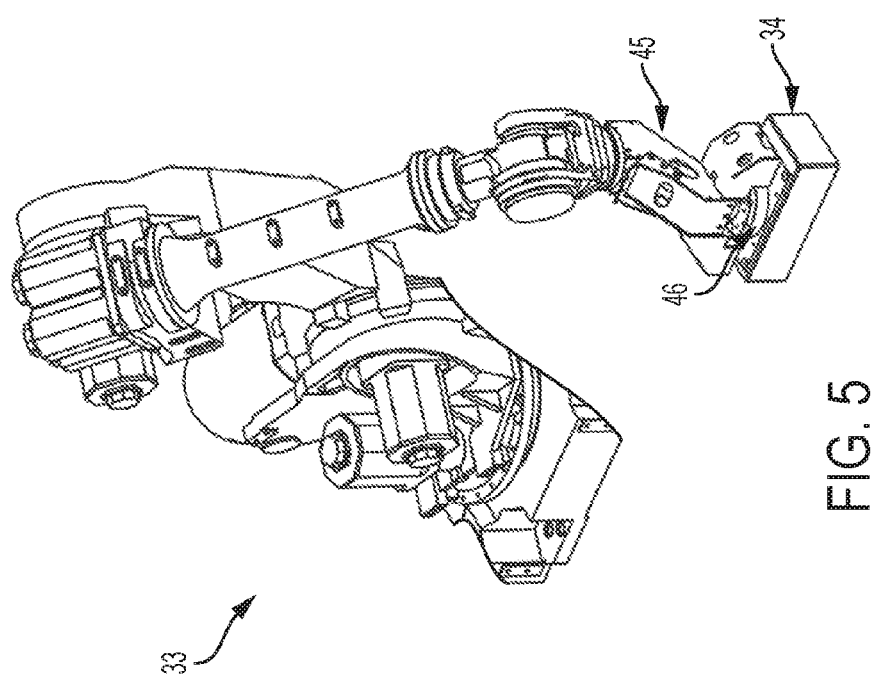
Figure 6:
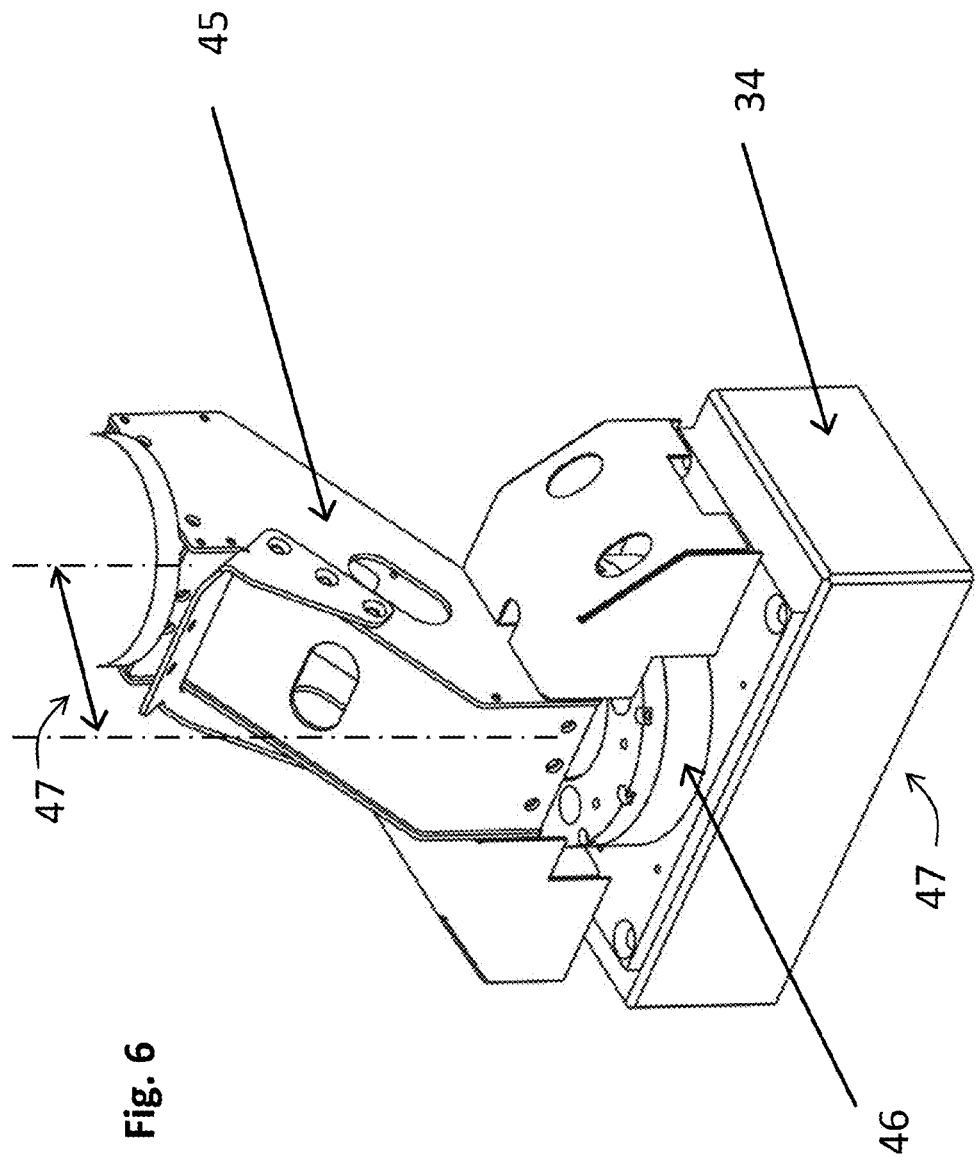
FIG. 6 shows a detailed view of the gripper shown in FIG. 5.

In FIGS. 5 and 6, an embodiment of a first gripper in accordance with the invention is now shown again such as can in particular be used for picking up the workpieces from a container. It is a magnetic gripper 34 in this respect. In this respect, a magnetic gripping surface 47 is provided at the lower side of the gripper. The magnetic gripper 34 in this respect has an electromagnet which generates a magnetic force on the magnetic gripping surface 47 for holding magnetizable objects.

The gripper in accordance with the invention is arranged cropped at the end member of the gripping arm, for example at the end member of the gripping arm of a robot 33. In this respect, a central axis of the gripper 34 or of the magnetic gripping surface 47 is arranged offset by a spacing 48 from an axis of rotation of the last pivot joint of the gripping arm. For this purpose, a cropped arm 45 is provided which connects the magnetic gripper 34 to the gripping arm. It is possible by the cropped configuration of the gripper also to use it directly next to a side wall of the container in the interior of the container for picking workpieces. It is thus in particular avoided that interfering edges further up at the gripping arm prevent a moving of the magnetic gripper directly to a wall region of the container.

A compensation unit 46 such as will be described in more detail in the following can furthermore be provided. This prevents an overload of the gripping arm from taking place on a collision of the gripper 34 with interfering edges or with workpieces. In addition, it is prevented that a safety deactivation of the robot is activated which would only be able to be bridged manually.

Figure 7:
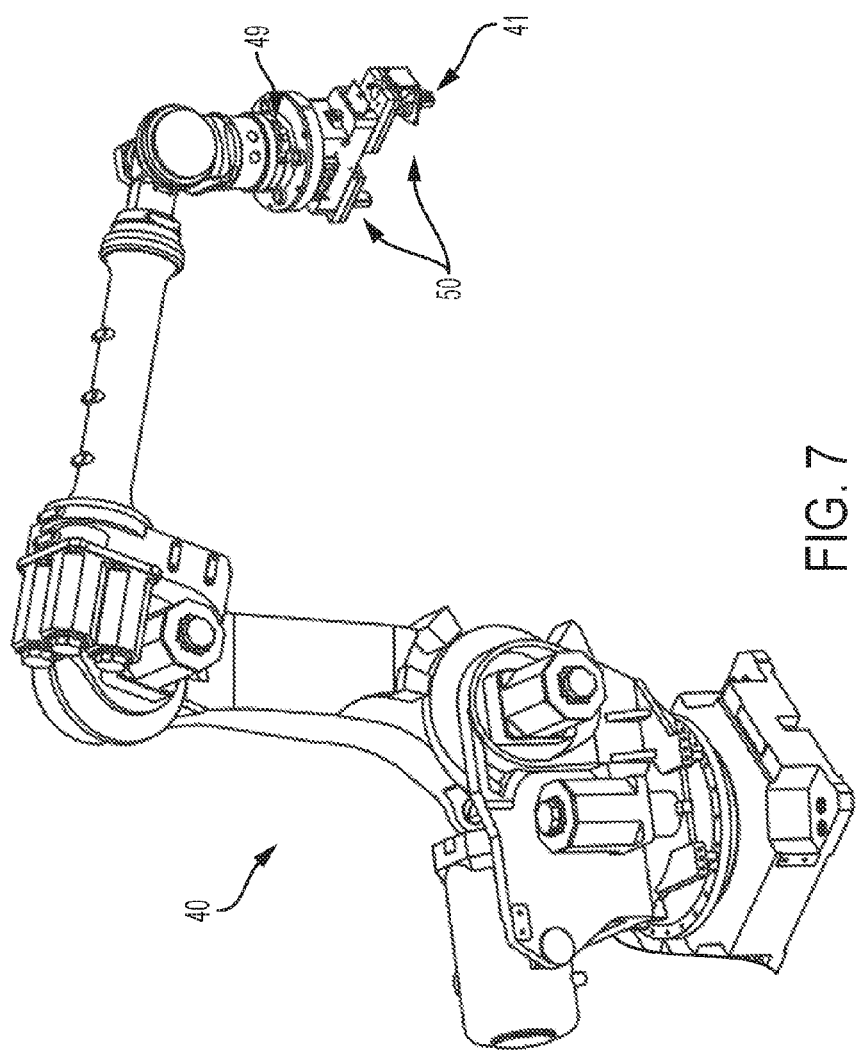

In FIG. 7, an embodiment of the second gripper 41 is shown which is likewise arranged at a gripping arm of a robot 40. In the embodiment, a two-finger gripper having fingers 50 which can be traveled in a linear manner is used as the gripper in this respect. The fingers can in this respect move into cut-outs of the correspondingly shaped workpieces and can grip the workpiece by moving apart or moving together. With differently shaped workpieces, other mechanical grippers can naturally also be used, in particular three-finger or multifinger grippers or bar grippers. A compensation unit 49 which protects the robot arm from overload on collisions is also provided in the embodiment shown in FIG. 7.

Figure 8:
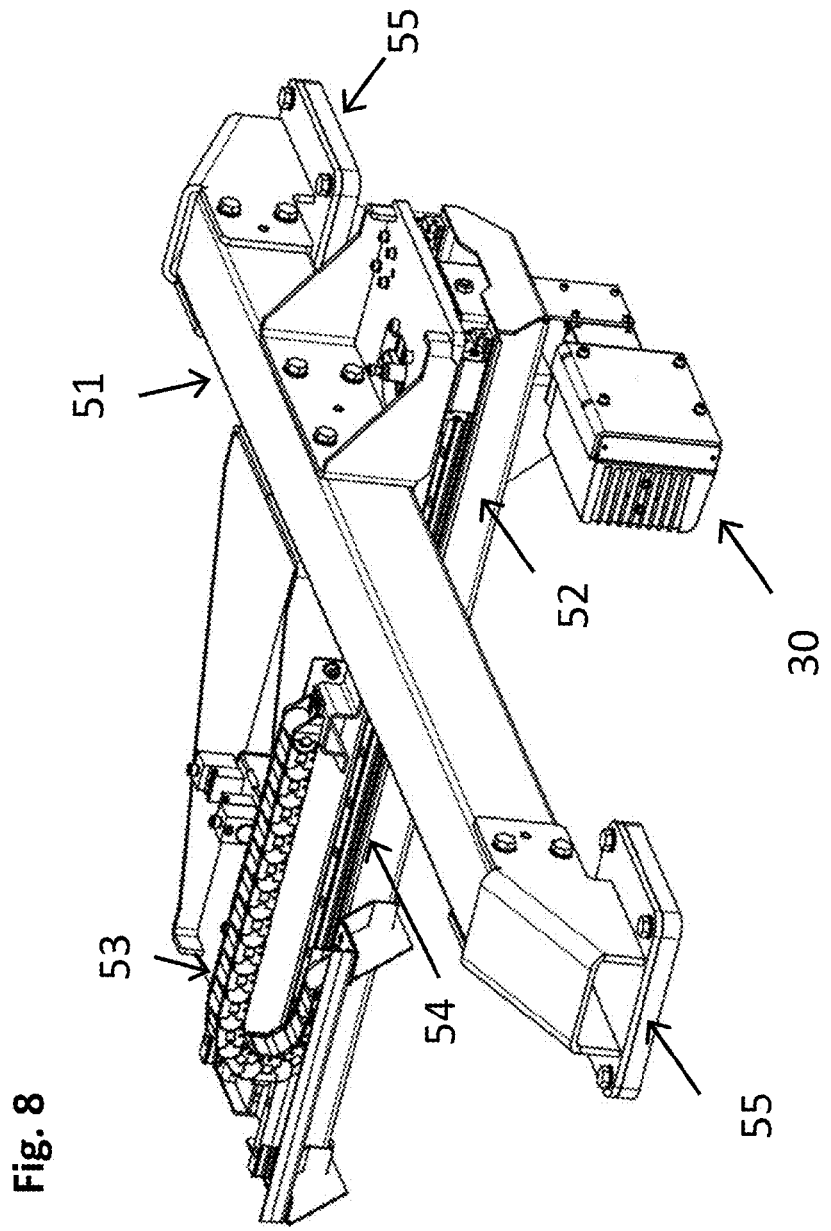

FIG. 8 shows an embodiment of an object recognition device for detecting workpieces which can be traveled from a position of rest into a measuring position and back by a travel arrangement.

The object recognition device shown in FIG. 8 can in this respect in particular be used in the embodiment shown in FIG. 4a as an object recognition device 30 for detecting the workpieces in a container. The second object recognition device 42 used in the embodiment shown in FIG. 4a for detecting the workpieces on the intermediate station is in contrast rigid in the embodiment. Alternatively, however, this object recognition device 42 could also have a travel arrangement to be able to travel from a position of rest into a measuring position and back.

The object recognition device shown in FIG. 8 has a sensor 30 which detects the workpieces. The sensor 30 is arranged at a sensor arm 52 which is arranged in a travelable manner at a guide rail 54. The guide rail 54 is in turn arranged at a mounting bar 51 in order to thus be able to mount the fastening pieces 55 on a pedestal. The exact arrangement of the two pedestal columns can be recognized in FIG. 4a.

In the embodiment shown in FIG. 4a, the object recognition device is in this respect arranged on pedestal columns such that the containers can be led between the pedestal columns on the channeling into a removal position.

Figure 9:
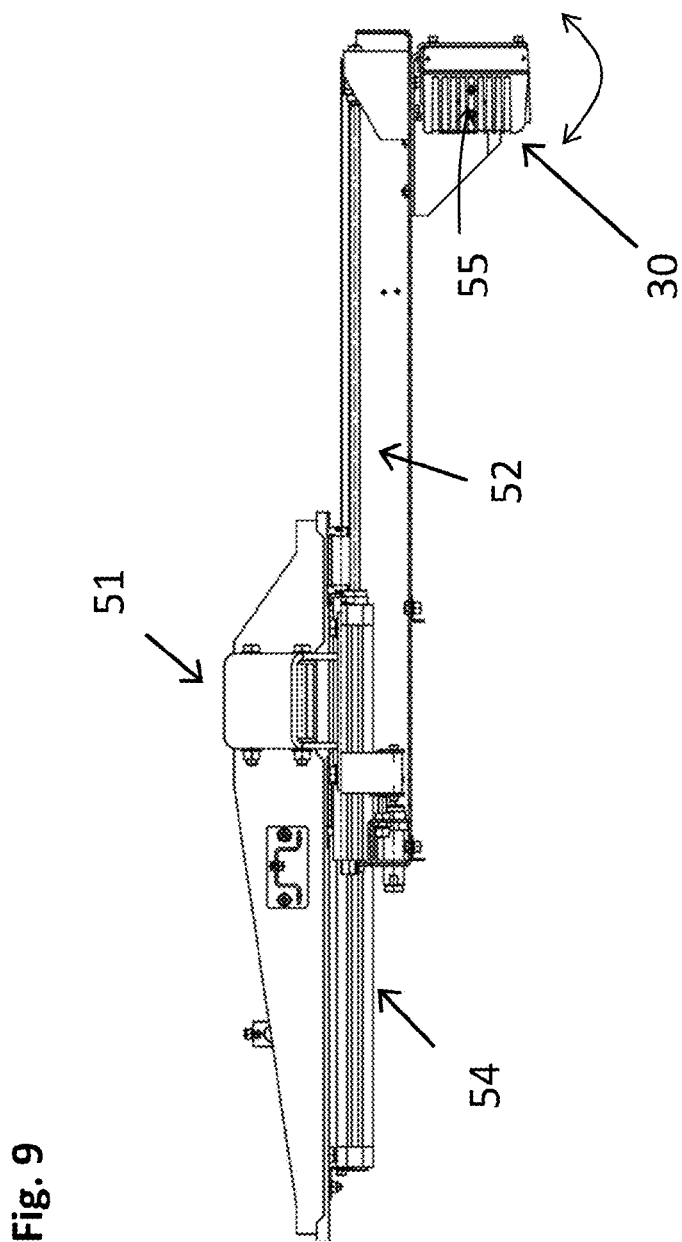
FIG. 9 shows the travelable object recognition device shown in FIG. 8 in a side view.

As can be recognized in FIGS. 8 and 9, the sensor 30 can be traveled along the guide rail 54 by moving the sensor arm 52. In the embodiment, the object recognition device is structured in this respect such that the sensor 30 can be traveled in a horizontal direction.

In the position of rest, the object recognition device is located outside a collision region with the first gripper 34 so that it has free access to the container. The sensor 30 is then traveled over the container by traveling out the sensor arm 52 into the measuring position in which the detection of the workpieces takes place for detecting the workpieces in the container. In its measuring position, the sensor 30 is located approximately centrally above the container. After the measurement, the sensor is again moved back into the position of rest in which it is arranged outside the base surface of the container.

In this respect, the movements of the object recognition device and of the removal gripper 35 are synchronized with one another so that the detection of the workpieces in the container always takes place when the gripper 34 places a workpiece on the intermediate station. The object recognition device is then traveled back into the position of rest so that the gripper 34 can remove a new workpiece from the container. In the following placing of the workpiece on the intermediate station, a measurement in turn takes place.

A similar procedure would in this respect also be conceivable with the second object recognition device 42 and the second gripper 41.

Alternatively or additionally, the object recognition device could also be traveled in the vertical direction. On the one hand, such a vertical travel capability could be used in the same way as the horizontal travel capability to move the sensor out of a collision region with the gripper when the latter picks up a workpiece and to move it closer toward the workpieces again to carry out a detection. In addition, it would be conceivable to track the object recognition device in a vertical direction with an emptying filling level of the container so that the object recognition device is always arranged in an unchanging distance region from the workpieces arranged the highest in the container in the measurement. A constant detection quality can hereby be achieved.

In the embodiment, a laser scanner can be used as a sensor of the object recognition device. The scanner can in this respect transmit a plurality of laser beams at small intervals so that a fan of laser beams is created. The fan formed by the laser beams is then pivoted over the detection region by pivoting the sensor, whereby a spatial detection of the detection region takes place. Geometrical data are created in this respect by distance measurement using the laser beams.

An arrangement of the sensor approximately centrally above the container in this respect has the advantage that the side walls of the container do not form shadows. The travel capability of the sensor in this respect makes it possible to position the sensor in the measuring position at a sufficiently small distance from the workpieces to be measured and nevertheless not to come into conflict with the gripper or with the gripper arm moving the gripper. This is in particular of special importance when detecting the workpieces in the container since the scanner has to be positioned so low above the container, at least when it cannot be traveled vertically, that it still detects workpieces with sufficient accuracy with an almost emptied container.

Figure 10:
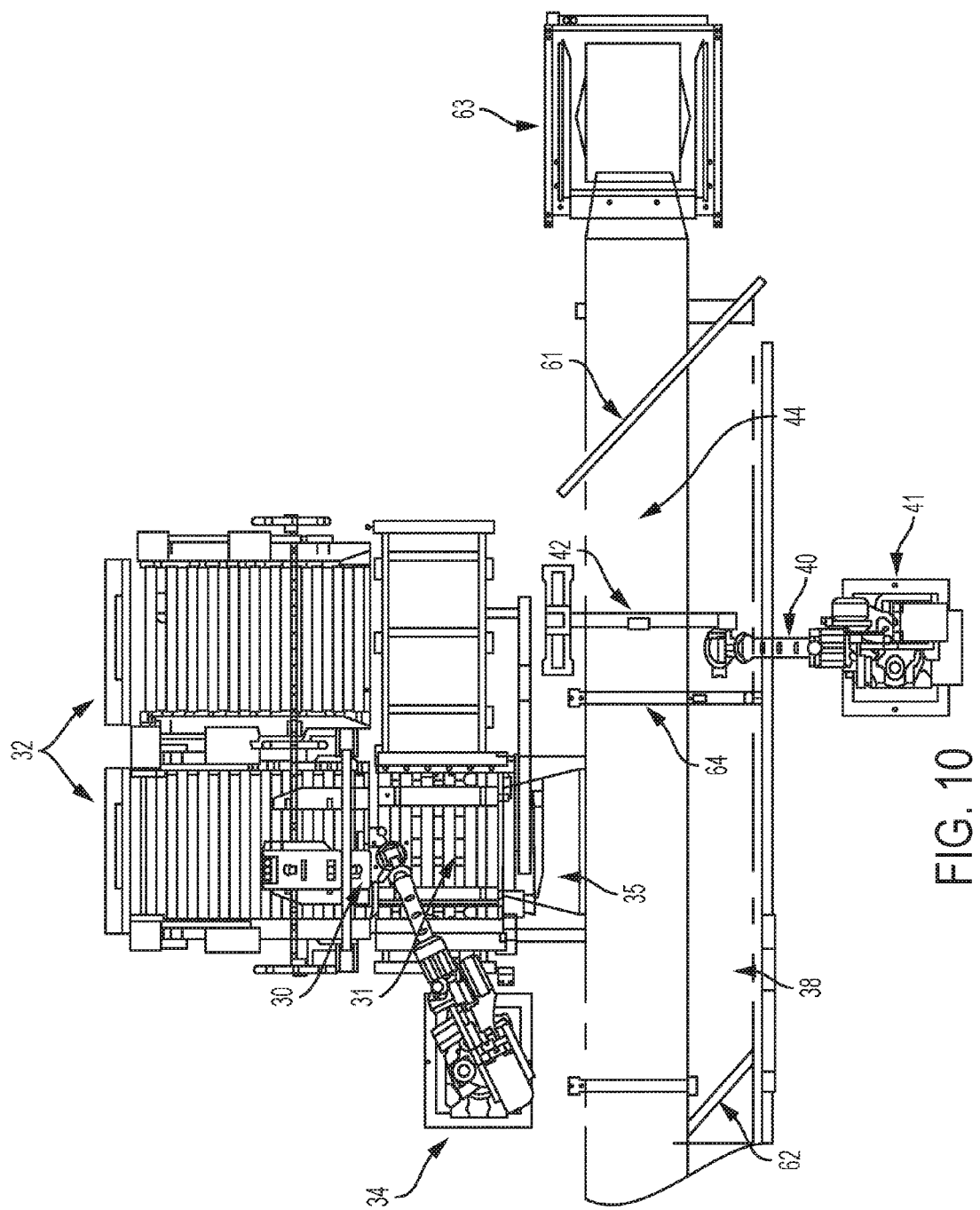
FIG. 10 shows a second embodiment of an apparatus in accordance with the invention for the automated removal of workpieces randomly arranged in a container in which an embodiment of an intermediate station in accordance with the invention having a revolving transport path is used.

In FIG. 10, a further embodiment of an apparatus in accordance with the invention for the automated removal of workpieces from a container is shown which is based on the embodiment shown in FIG. 4a and in which the peripheral transport path of the intermediate station is provided which is only indicated schematically in FIG. 4a. Except for the differently configured intermediate station, all the components in this respect correspond to the embodiment shown in FIG. 4a so that reference is made to the description there with regard to the total design of the apparatus.

The intermediate station also has a first transport belt 38 in the embodiment shown in FIG. 10, which transport belt transports workpieces placed in a placing region 35 to a removal region 44. The workpieces are there detected by the object recognition device 42 and are picked and removed by the gripper 41 which is moved by the gripping arm 40.

In accordance with the invention, the intermediate station shown in FIG. 10 is now equipped with a return path 60 which allows workpieces not removed in the removal region 44 to run around. The return path 60 is in this respect likewise a transport belt which is arranged next to the first transport belt 38 and is moved in the opposite direction. The return path 60 in this respect ensures that workpieces not removed in the removal region 44 are transported back and again arrive on the first transport belt 38 so that they again move into the removal region 44 where they can again be detected and picked.

If therefore a workpieces on its first detection lies at such a position in the removal region 44 that it cannot be picked or can only be picked with difficulty, the control can dispense with a picking attempt and can allow the workpiece to run around. The circulation path is in this respect designed such that the workpiece is very highly likely to arrive in the removal region 44 in a different position on the next circulation so that there is a high probability that the workpiece lies in a position which can be picked more easily on the second attempt. Workpieces with which an unsuccessful picking attempt was made can also be treated in the same way.

The removal region could also be arranged in the region of the return path in the embodiment shown in FIG. 10 without the function of the intermediate station changing.

Since the workpieces lie randomly arranged on the transport belts 38 and 60, the probability is very high that they change their position on the circulation. This can be assisted by further measures in accordance with the invention. An abutment 61 is thus provided, for example, which extends obliquely over the first transport belt 38 and forces the workpieces from the first transport belt 38 onto the return path 60. In the same way, an abutment 62 is provided at the end of the return path 60 which conveys the workpiece back onto the first transport path 38 again. In this respect, a positional change of the workpieces is effected solely by the contact with the abutments and the forcing onto the respective other belt.

Provision can furthermore be made that the workpieces run through a vertical difference during the circulation. A slanted plane or an edge having a vertical difference can in particular be provided in this respect over which the workpieces are forced. A position change is also hereby effected. At the same time, workpieces caught up with one another can optionally be separated from one another.

In this respect, a slanted plane which the workpieces slide down is advantageously provided in the transition region between the first transport belt 38 and the return path 60. The first transport path 38 in this respect advantageously extends in the vertical direction, whereas the return path 60 is arranged obliquely so that a vertical difference results in at least one of the two end regions of the two transport paths.

To prevent parts which cannot be picked from remaining on the circulation path for an unlimited time, a separation mode can be provided in which the circulation is ended under certain conditions and the workpieces are emptied into a collection container 63. The abutment 61 can in particular be moved for this purpose such that the workpieces are transported via the first transport path 38 up to its end and into the container 63 placed there.

In this respect, in particular a separation mode can be provided in which no new workpieces are placed onto the intermediate station by the first gripper. At least one picking attempt then takes place with all the workplaces located on the intermediate station. In this respect, a plurality of circulations can optionally also be carried out. The workpieces then remaining on the intermediate station can then be emptied into the container 63. It is thereupon in turn possible to switch into the normal mode.

The separation mode can furthermore be used to separate out workpieces which erroneously arrived on the intermediate station. The separation mode can thus be activated when a workpiece was detected on the intermediate station which does not satisfy the demanded workpiece criteria and is therefore not to be positioned at a target receiver.

In the embodiment of an intermediate station shown in FIG. 10, the reorientation device 64 is also shown which was already described with regard to the embodiment in FIG. 4a, but which was not shown there. In this respect, it is a flap which is arranged above the first transport belt 38 between the placing region and the removal region. The flap 64 should in this respect in particular flip over workpieces standing on their edge to make them easier to pick.

Figure 11:
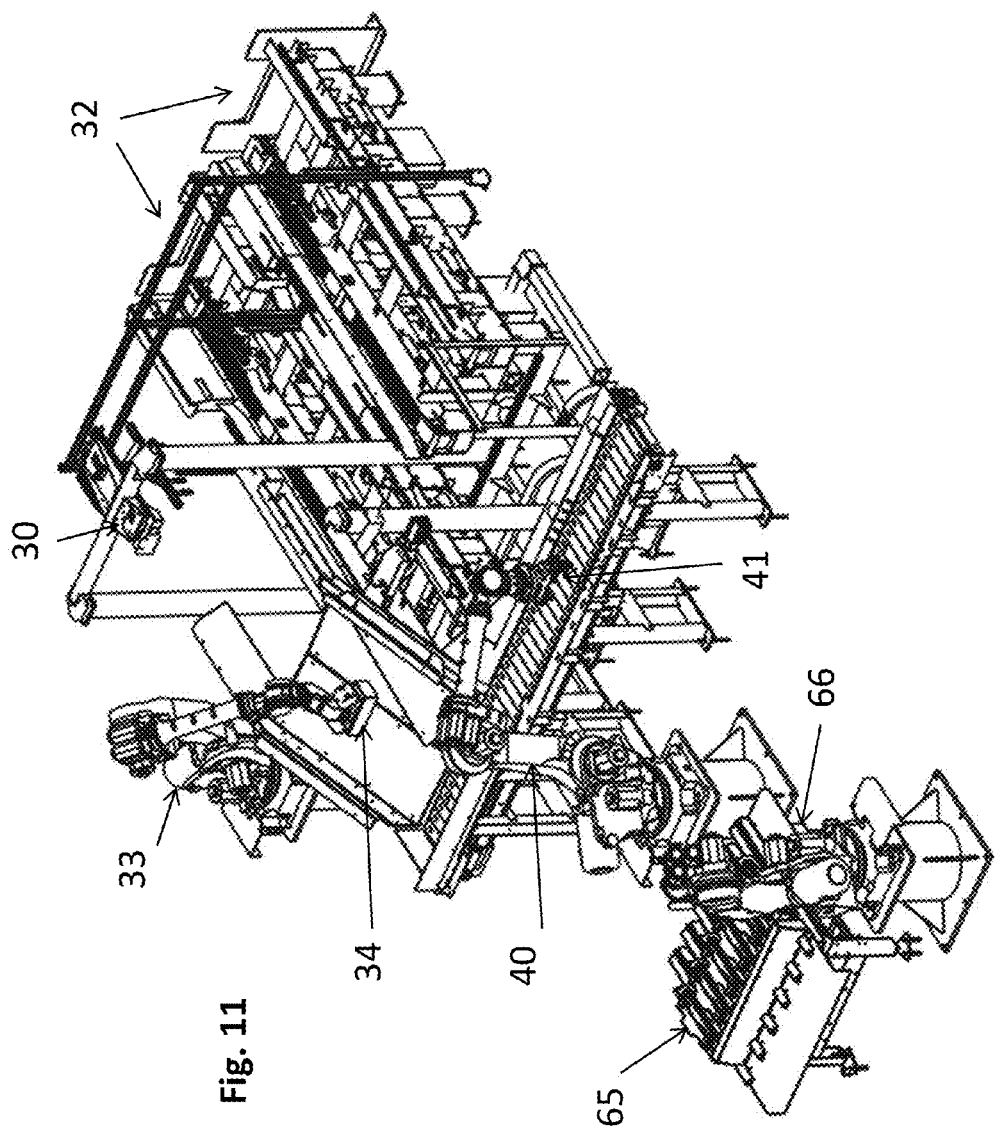
FIG. 11 shows a third embodiment of an apparatus for the automated removal of workpieces randomly arranged in a container, which is based on the embodiment shown in FIG. 4a and which furthermore comprises an embodiment of a second intermediate station on which workpieces can be placed in at least one receiver.

In FIG. 11, a further embodiment of an apparatus in accordance with the invention for the automated removal of workpieces arranged in a container is shown. This embodiment is also based on the embodiment shown in FIG. 4a so that reference is first made to the description of the embodiment shown in FIG. 4a with respect to the configuration.

On the one hand, the channeling in and out for containers with workpieces is shown which is only shown schematically in FIG. 4a. They are put to one side and are moved from there in an automated fashion into the removal region 31. The workpieces are now removed after one another by the first gripper 34 until the container is 100% empty. The emptied container is thereupon moved to the channeling out path and is channeled out from there.

In this respect, a safety detection of the container interior advantageously takes place again after the removal of the last workpiece to ensure that actually no more workpieces remain in the container. If therefore the control only identifies a single workpiece on a detection procedure and if the gripper was controlled accordingly to remove it, a further detection procedure is nevertheless initiated. Only in this way can it be ensured that the last detected workpiece was also actually removed.

Furthermore, the embodiment shown in FIG. 11 shows a second intermediate station 65 on which the workpieces removed from the first intermediate station by the gripper 41 are placed to be picked again. The placing on the second intermediate station in this respect takes place in a defined position, with the placing serving to be able to pick more accurately on the picking up and/or to be able to vary the orientation of the workpiece at the gripper. The second intermediate station can furthermore also serve as a buffer store.

Figure 12:
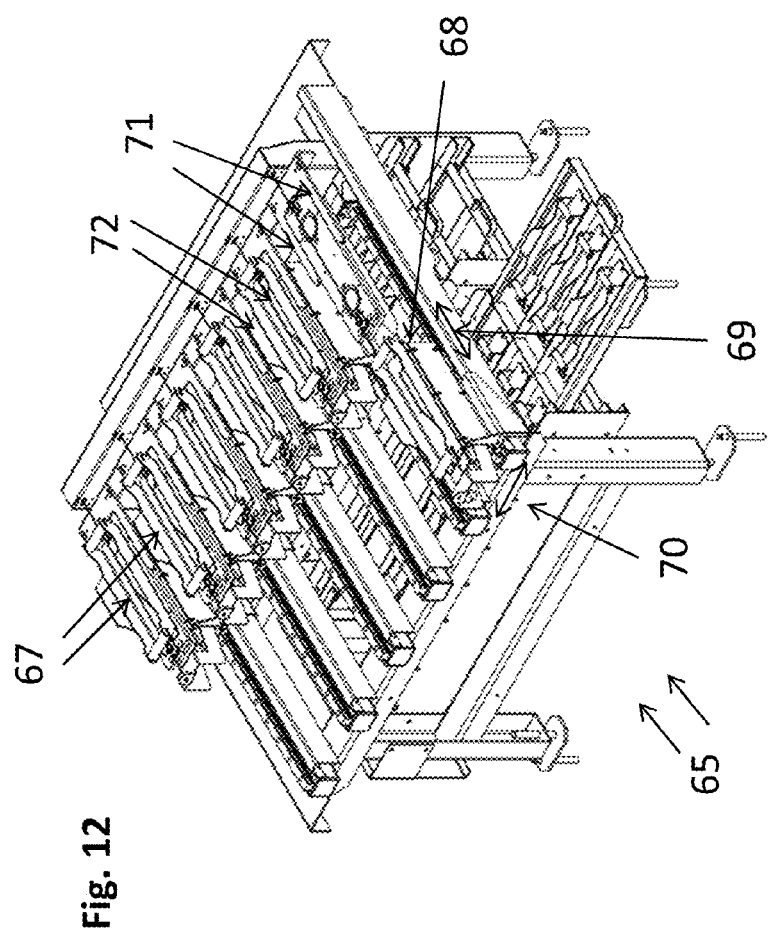
FIG. 12 shows the embodiment of a second intermediate station as is used in the apparatus in accordance with FIG. 11 in a detailed view.

An embodiment of such an intermediate station 65 is shown in FIG. 12. The intermediate station has at least one receiver 67 for the workpieces into which the workpiece can be placed in a defined position and orientation. In the embodiment, in this respect, a plurality of such receivers 67 are arranged next to one another so that the intermediate station also serves as a buffer store.

The receivers 67 have a compensation apparatus 70 which also allows a placing of the workpieces in the receiver 67 with a certain positional offset in that the receiver is moved by the contact with the workpiece to be placed down. For this purpose, the receiver 67 has receiver steps 72 against which a badly positioned workpiece first abuts and in so doing causes a movement of the receiver by which the workpiece can be placed in the receiver.

The receiver 67 thus allows a placing of workpieces in a defined positional region and thus in particular also allows the placing of workpieces not exactly picked in a desired position.

The compensation unit 70 can be fixed on the intermediate station so that the receiver and thus the workpiece is arranged in a defined desired position for the removal. The removal of the workpiece can hereby take place with a greater accuracy.

The receivers 67 are displaceable on rails 69 at the intermediate station. In this respect, the receivers can be displaced from a loading position, in which the compensation unit allows a movement of the receivers 67, into a removal position in which the compensation unit is fixed. Abutments 71 are provided for this purpose into which the receiver 67 is traveled and which fix the receiver in a defined position.

The placing and the removal of workpieces onto the second intermediate station 65 in this respect in each case advantageously takes place by mechanical grippers since they have a relatively high picking accuracy by which the workpieces can be placed in a defined manner in the receivers and can be picked up again with a higher accuracy.

The picking of the workpieces on the second intermediate station in this respect takes place without a previous detection of the workpieces in that the grippers are traveled to the known removal position of the receiver.

The receivers are furthermore designed so that the workpieces can be picked from two different directions. In the embodiment, the workpieces in this respect have cut-outs into which the fingers of a finger gripper engage. The receivers are designed in this respect such that the cut-outs are accessible from two sides in the workpieces when a workpiece is arranged in the receiver. The orientation of the workpiece at the gripper can hereby be reversed in that the workpiece is picked from one side on the placing down, but from the other side on the picking up.

In this respect, the placing down and the picking up can take place by the same gripper. In the embodiment shown in FIG. 11, however, two separate grippers are used.

Figure 13:
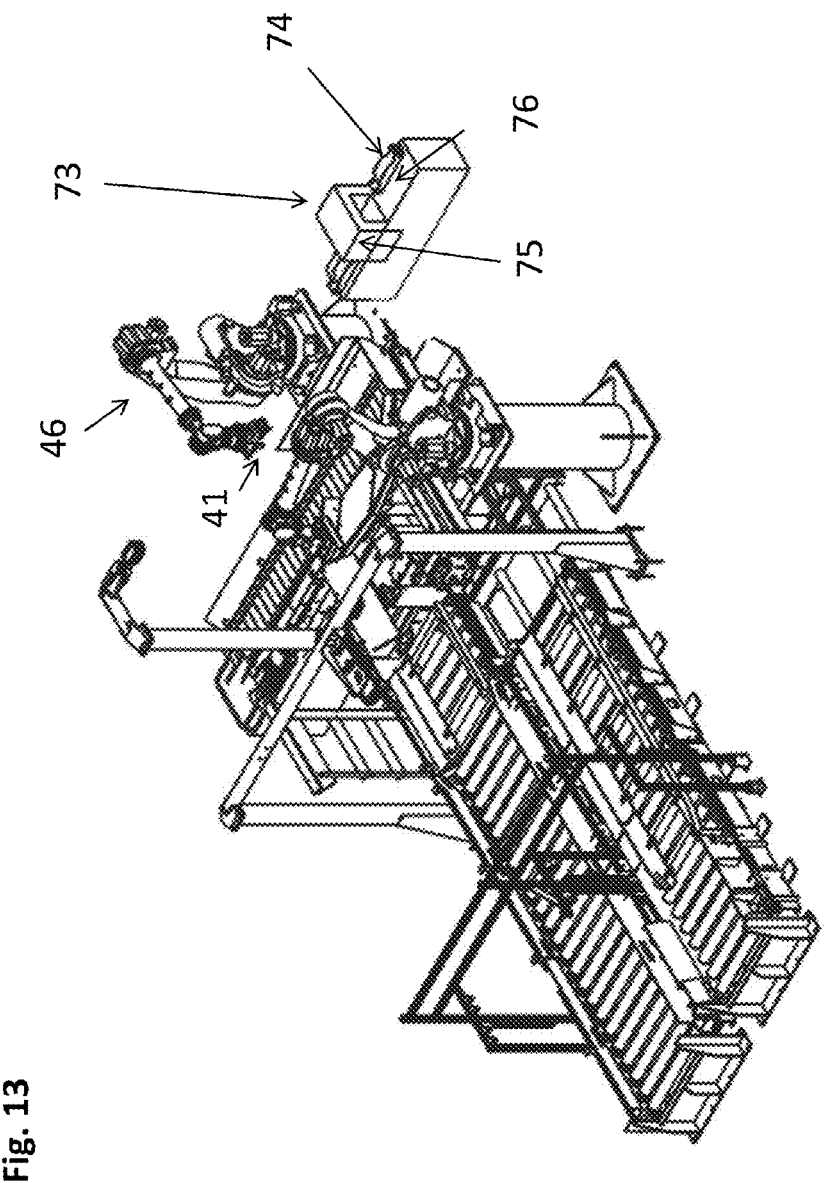
FIG. 13 shows a fourth embodiment of an apparatus in accordance with the invention for the automated removal of workpieces randomly arranged in a container, which is based on the embodiment shown in FIG. 4a and which furthermore comprises a second embodiment of a second intermediate station on which workpieces can be placed in a receiver.

In the embodiment of an apparatus in accordance with the invention shown in FIG. 13, which is likewise based on the embodiment shown in FIG. 4a, a further embodiment for a second intermediate station 73 is now shown. This intermediate station also has at least one receiver 74 in which workpieces can be placed down in a defined manner. The receiver is in this respect designed in exactly the same way as the receivers shown in FIG. 12.

The intermediate station shown in FIG. 13 in this respect has a transport belt by which the receiver 74, which is at least movable to a certain extent on the transport belt, can be traveled toward abutments to fix it in its position. A compensation unit is also hereby provided which allows a placing down of the workpieces in the receiver 74 with a certain offset and which nevertheless moves the workpiece or the receiver for removal into a defined position so that picking can again take place with higher accuracy. Furthermore, picking can also take place here from both sides to change the orientation of the workpiece at the gripper.

The intermediate station 73 shown in FIG. 13 is furthermore equipped with a functional unit 75 which the workpieces run through on the intermediate station. The functional unit is in this respect a demagnetization station through which the workpieces are guided on the intermediate station.

In the embodiment shown in FIG. 13, the same mechanical gripper 41 is in this respect used both for placing the workpieces on the intermediate station 73 and for removing the workpieces.

Furthermore, a determination of the picking accuracy can take place with an apparatus for the automated handling of workpieces in accordance with the present invention. It can in this respect in particular be determined whether and/or how much the position of a workpiece picked up at the gripper differs relative to the gripper from a predefined desired picking position or from a predefined desired picking position region. The process routing of the handling is advantageously then controlled in dependence on the result of such a picking accuracy determination.

Figure 14:
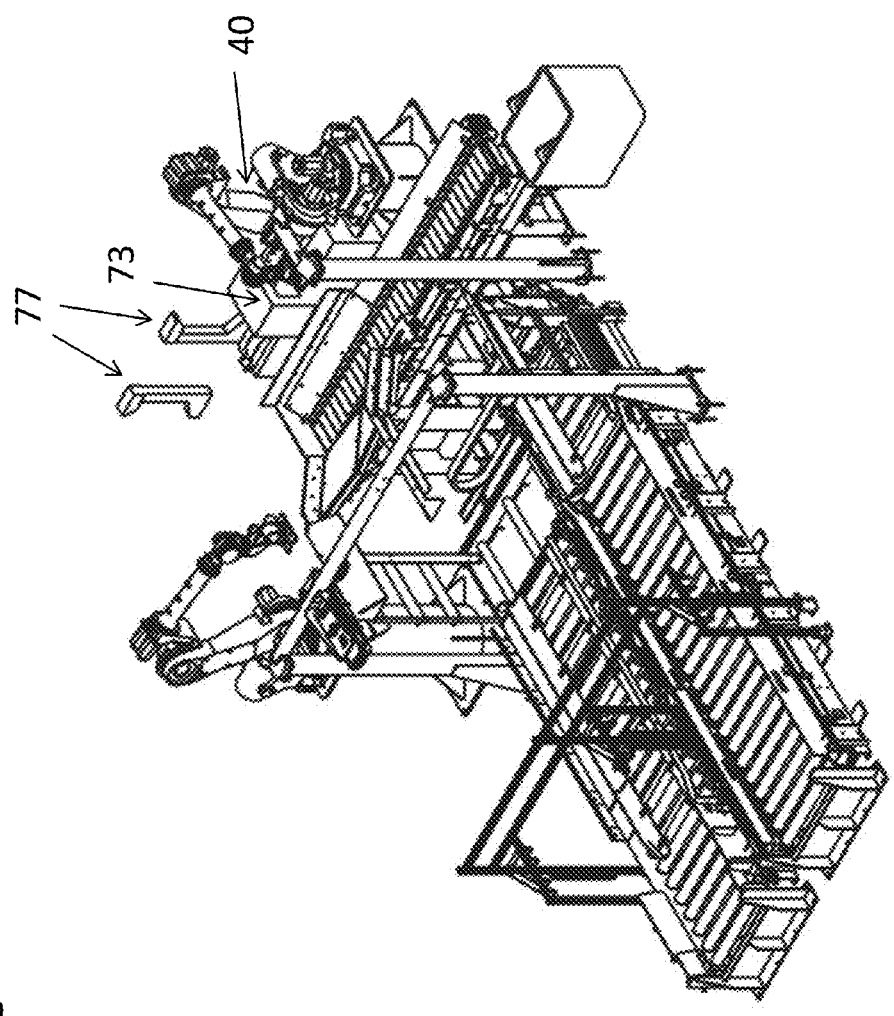
FIG. 14 shows a fifth embodiment of an apparatus in accordance with the invention for the automated removal of workpieces randomly arranged in a container which is based on the embodiment shown in FIG. 4a and which furthermore comprises a measuring device by means of which a measurement of the picking accuracy is possible.
Figure 15:
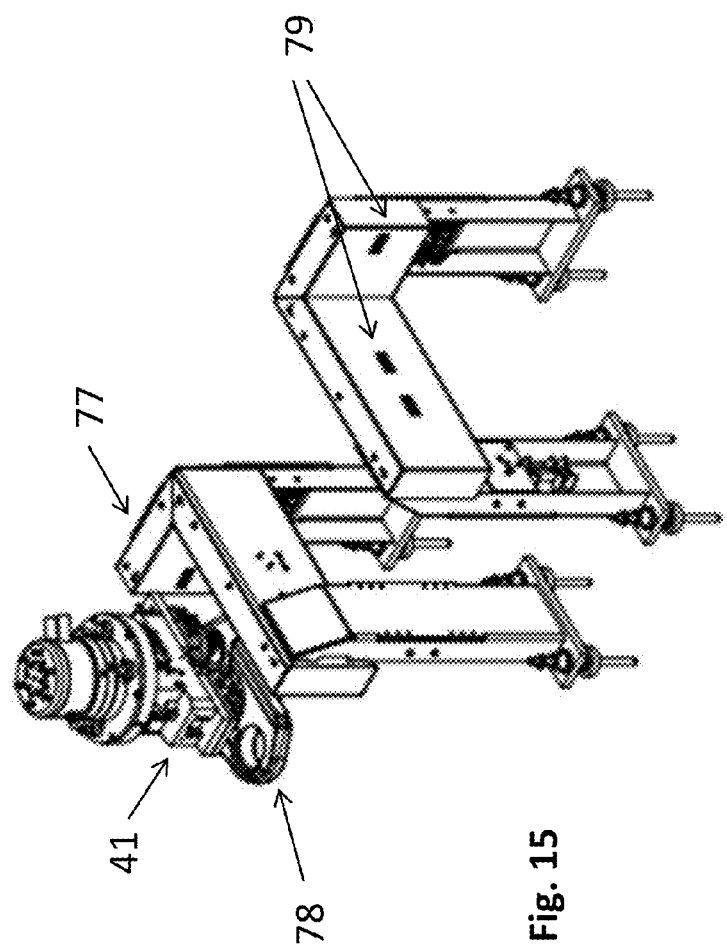
FIG. 15 shows a detailed representation of an embodiment of a measuring device in accordance with the invention in which the picking accuracy can be measured.

In this respect, an embodiment of an apparatus in accordance with the invention is shown in FIGS. 14 and 15 with which the picking accuracy is determined by traveling the gripper with the workpiece toward a separate measuring device 77. For this purpose, the gripper 41 is traveled into a defined position before the measuring device 77 when it has picked a workpiece 78. The measuring device 77 then determines the position of the workpiece 78 and can thus determine the relative position between the workpiece and the gripper from the known position of the gripper and the position of the workpiece. A determination of the picking accuracy or of the position of the workpiece at the gripper is hereby possible.

In the embodiment, the separate measuring device 77 has laser sensors 79 in this respect. In the embodiment, a three-point measurement is carried out in this respect.

A determination of the picking accuracy can in particular be of advantage with mechanical grippers since they admittedly allow a relatively exact picking of the workpieces, but there are also degrees of freedom on picking here. If it is a finger gripper or a jaw gripper, the workpiece can usually be picked in different positions at least with respect to the delivery direction of the gripper to the workpiece. With the finger gripper, this relates to the question how far the fingers engage into a corresponding receiver at the workpiece or how far the fingers engage around the workpiece.

In the embodiment of an apparatus in accordance with the invention shown in FIG. 14 which is based on the embodiment shown in FIG. 4a, the picking accuracy of the gripper 41 which is used for removing the workpieces from the first intermediate station is in this respect determined. Alternatively, however, the picking accuracy on the removal of a workpiece from a second intermediate station could also be determined.

Alternatively to the separate measuring device which is shown in FIGS. 14 and 15 and toward which the gripper can be traveled, a sensor arranged at the gripper itself can also be used for determining the picking accuracy. An embodiment for such a sensor will be described in more detail in the following.

The result of the determination of the picking accuracy can in this respect be used in different manners for controlling the apparatus.

On the one hand, it is possible that a picking error on the placing of the workpiece recognized in this determination is compensated by a corresponding control of the griper or of the gripping arm moving it. This substantially corresponds to a zero point adjustment of the gripper on placing which changed in dependence on a deviation of the workpiece from a desired picking position.

It is furthermore conceivable that poorly picked workpieces are placed down again to be picked again. Such a procedure can in particular be sensible when the picking accuracy lies outside a predefined permitted region.

In this respect, the workpiece can be placed back on the transport belt on the picking from an intermediate station with a transport belt such as is shown in FIG. 4 or 14, for example, when the picking accuracy falls below certain criteria. In an advantageous manner, the workpiece is in this respect placed onto the transport belt in a position from where the workpiece again arrives in the removal region. The workpiece is in this respect advantageously again detected and then again picked using the data determined from this. In this respect, the probability is high that the workpiece can now be picked with sufficient accuracy.

In this respect, a combination of the two procedures is also conceivable. If the accuracy therefore lies outside a permitted region, the workpiece is placed back. Otherwise, the determined deviation from a desired picking position on the placing down of the workpiece is compensated by a corresponding movement.

Figure 16:
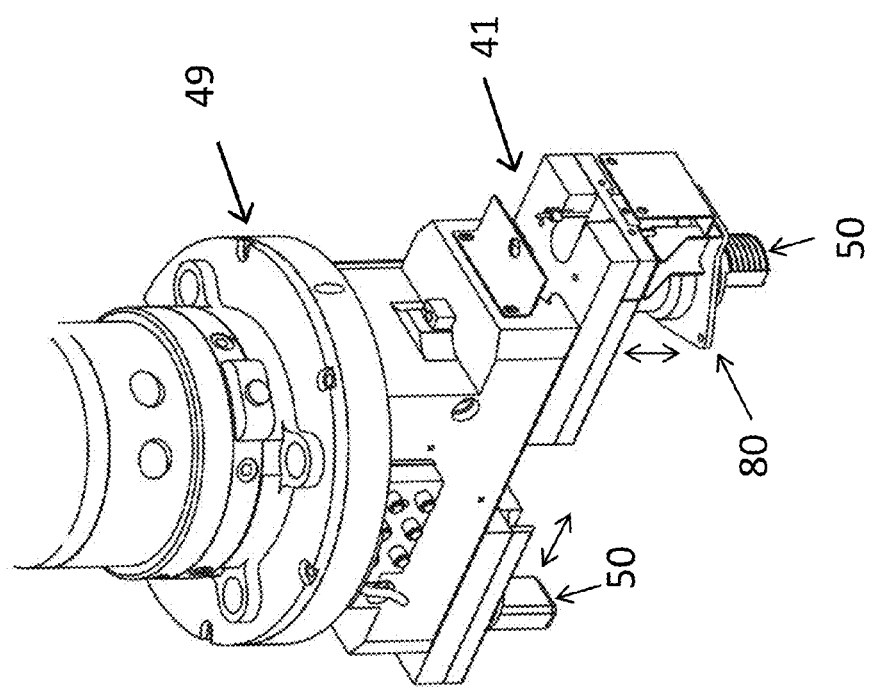
FIG. 16 shows an embodiment of a gripper in accordance with the invention with a stabilizer element.

In FIG. 16, an embodiment of a gripper in accordance with the invention with a stabilizer element is shown. In the embodiment, it is in this respect a mechanical gripper with which the workpiece is picked. To prevent positional changes of the workpiece at the gripper, while the gripper is moved, the stabilizer element 80 is traveled toward the picked workpiece. The stabilizer element 80 has a stabilizer plate at which contact elements are provided for contacting the workpiece. The additional contact points thus provide a positional fixing of the workpiece at the gripper.

In the embodiment the gripper is configured as a two-finger gripper having the two gripping fingers 50 which are introduced into cut-outs of the workpieces for picking. The two contact points established by the two gripping fingers 50, however, do not fix the workpiece in a clear position with respect to the gripper so that only the further contact points of the stabilization element establish a defined position of the workpiece at the gripper. The contact points of the stabilizer element are in this respect advantageously arranged remote from line connecting the two gripping fingers 50 in this respect.

In the embodiment, the stabilizer element 80 is arranged in the region of the two gripping fingers and is attached around it. The stabilizer element could, however, also be arranged in any other position at the gripper.

The design of the stabilizer element can again be recognized in the sectional view shown in FIG. 17. In this respect, the stabilizer plate 81 can be recognized at which, for example, contact elements can be arranged in the region 82. The stabilizer plate 81 surrounds the gripping finger 50 in this respect in the form of a ring or of a horse-shoe in the embodiment.

The stabilizer plate 81 is arranged at a cylinder 83 by which it can be traveled to the workpiece. The cylinder 83 is a pneumatic cylinder. The stabilizer element can thus be traveled toward the workpiece when pneumatic pressure is applied at the one side of the cylinder or can be traveled in when pressure is applied to the other side of the cylinder.

The end abutments 84 and 85 of the cylinder 83 are equipped with sensors which recognize whether the stabilizer element is located in one of its end abutment regions. A determination of the picking accuracy is hereby possible since the moving-out distance of the stabilizer element depends on the position of the picked workpiece at the gripper.

If the stabilizer element is in this respect located in the active state in one of its end abutment regions, an insufficient picking accuracy is concluded since the gripper was then either traveled too far into the workpiece or not far enough. A more precise determination of the picking accuracy could naturally also take place by a measurement of the push-out length of the cylinder 83.

Alternatively to the sensor arrangement integrated into the stabilizer element 82 for determining the picking accuracy, a separate sensor would also be conceivable which is arranged at the gripper. For example, in this respect, a laser sensor could be used which is arranged at the gripper to determine the picking accuracy.

In FIG. 17, a compensation unit 49 can also be seen via which the gripper is fastened to a gripping arm.

Figure 19:
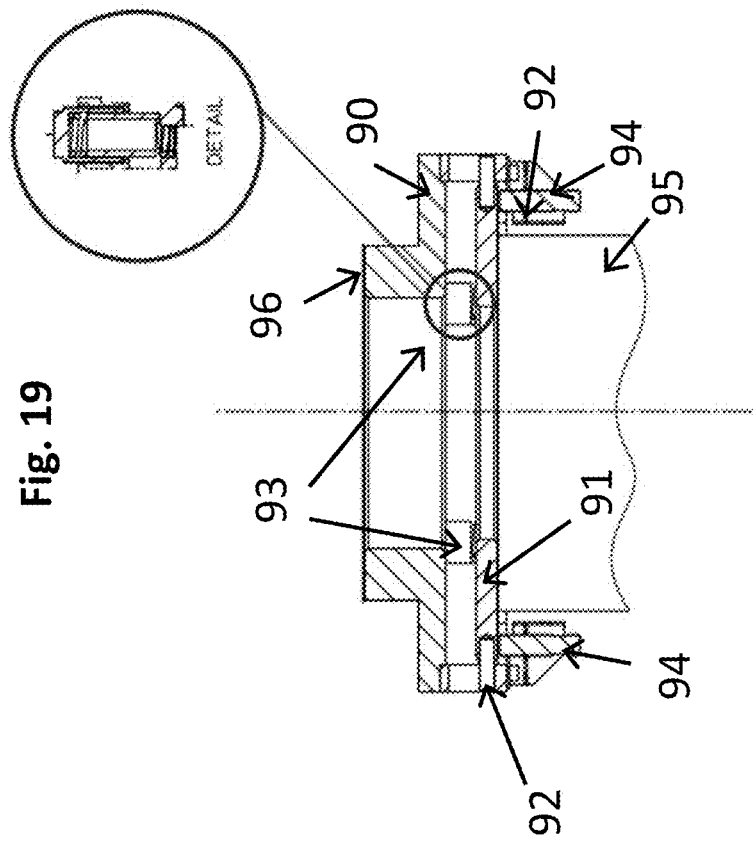
FIG. 19 shows a sectional view through the compensation unit shown in FIG. 18.
Figure 18:
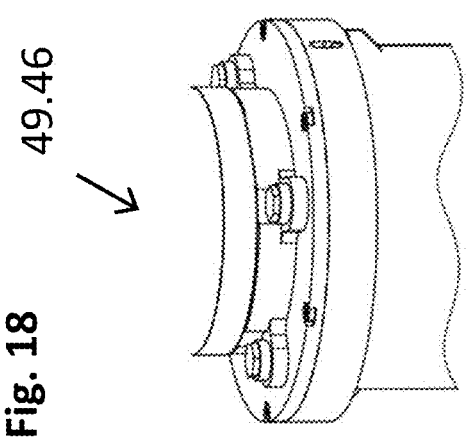
FIG. 18 shows a first embodiment of a compensation unit in accordance with the invention.

In FIGS. 18 and 19, a first embodiment of such a compensation unit is shown in more detail. In this respect, a base element 90 is provided at which a compensation plate 91 is arranged. The compensation plate 91 is engaged around by holding elements 92 of the base element 90. A spring arrangement 93 which presses the compensation plate 91 toward the holding regions 92 is arranged between the base element 90 and the compensation plate 91. In the embodiment, in this respect, a plurality of coil springs are provided which are arranged in corresponding spring sleeves. However, any desired other embodiments of such a spring arrangement are also conceivable.

The spring force of the spring arrangement is in this respect selected such that the compensation plate 91 is held rigidly at the base unit 90 in normal operation of the gripper. Only in the case of a collision of the gripper or of the workpiece arranged therein with an interfering edge or with another workpiece does the spring arrangement 93 allow a relative movement between the compensation plate 91 and the base element 90. The forces exerted on the gripping arm are hereby limited. It can in particular thus be prevented that the emergency stop of a robot used for moving the gripper or of a surface portal engages.

The force of the spring arrangement 93 can in this respect be set so that the compensation element can be adapted to the corresponding purpose. The setting of the spring force can in this respect in particular take place in that the gripper is moved together with a picked up workpiece into a 90° position to the vertical so that the static load by the gripper and the workpiece on the compensation unit is at a maximum. In this position, the preload of the spring arrangement 93 is set so that no deflection of the compensation unit takes place. It is hereby ensured that no deflection of the compensation unit takes place independently of the orientation of the gripper by the static forces alone which are applied to the compensation unit by the gripper and a picked up workpiece. Optionally, the preload of the spring arrangement 93 can in this respect still be increased by a certain value in order also to take account of dynamic loads, for example on the acceleration of the gripper or of the gripper arm.

The preload of the spring arrangement 93, however, has to be selected so that the compensation unit triggers before the emergency stop of the gripper arm engages.

The first embodiment of a compensation unit in accordance with the invention can in this respect, for example, be used together with a mechanical gripper. The first embodiment of a compensation unit in accordance with the invention can in this respect in particular be used for the second gripper which picks up the workpieces from the intermediate station. Furthermore, the first embodiment of the compensation unit in accordance with the invention can also be used with the third gripper which picks up the workpieces from the second intermediate station.

The first embodiment of the compensation unit in accordance with the invention in this respect has a spherical operation and in particular allows tilt compensation movements. The compensation unit in this respect advantageously allows a maximum compensation angle between 2° and 10°, in particular between 4° and 6°.

In this respect, guide elements are furthermore provided which prevent a rotation of the compensation plate 91 with respect to the base element 90. In the embodiment, guide pins engage for this purpose laterally in corresponding cut-outs of the compensation plate 91.

The compensation plate is in this respect round in the embodiment and has rounded edges to allow a pivot movement around any desired axes.

Contact sensors 94 are furthermore arranged in the region of the holding regions 92. They monitor whether the compensation plate 91 lies on the holding regions or was deflected. Collisions of the gripper can hereby be detected. The sensors 94 in the embodiment are inductive sensors. In the embodiment, in this respect, a plurality of sensors are provided so that information can be obtained on the direction of the deflection of the compensation plate 91. Four sensors are in particular provided in this respect.

The data obtained from the sensors can in this respect be used for controlling the gripper as follows: In normal operation, the compensation unit does not deflect so that the gripper adopts a defined position with respect to the gripping arm which remains unaffected by the compensation unit. On a collision, the compensation unit, however, deflects, which is recognized by the sensors 94.

In this case, the control still allows a certain adjustment path of the gripping arm which is, however, smaller than the compensation path of the compensation unit.

If the movement of the gripping arm, however, exceeds this permitted adjustment path after the recognition of a collision, the picking procedure is stopped and the gripper is traveled back into a zero position. A picking procedure is thereupon started again in that the workpieces are first detected and then a new picking movement is initiated. The compensation unit in this respect protects against an emergency stop of the robot, which could only be cancelled again manually.

Figure 20:
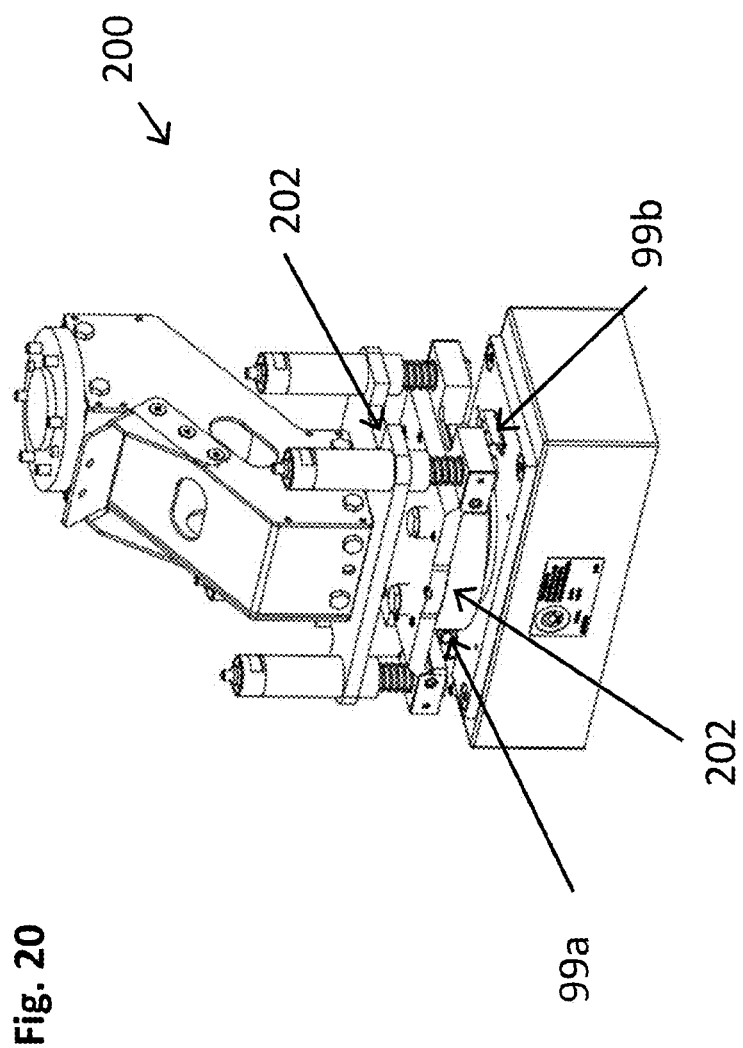
FIG. 20 shows a second embodiment of a compensation unit in accordance with the invention.
Figure 21:
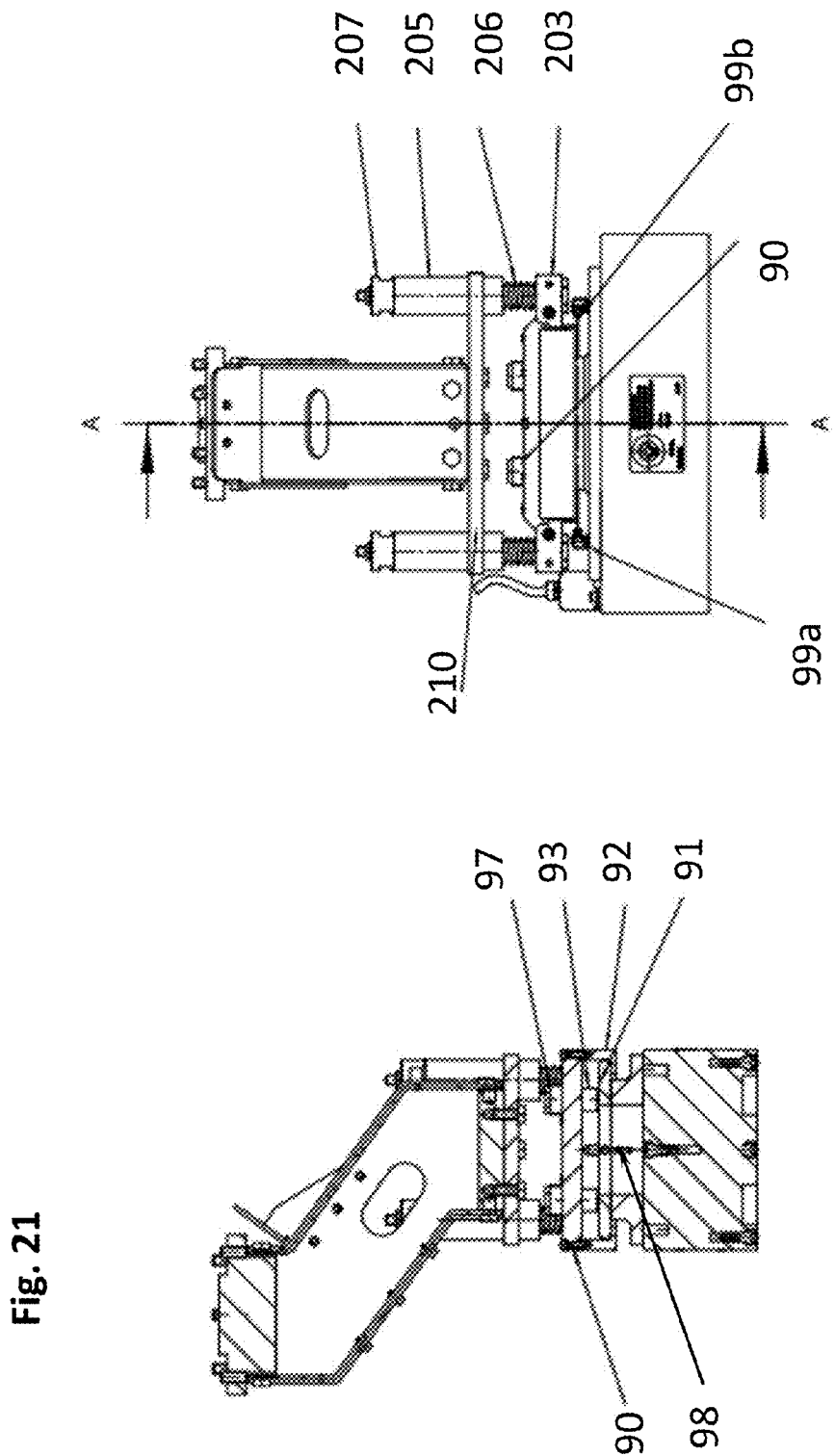
FIG. 21 shows a front view of and a sectional view through the compensation unit shown in FIG. 20.
Figure 22:
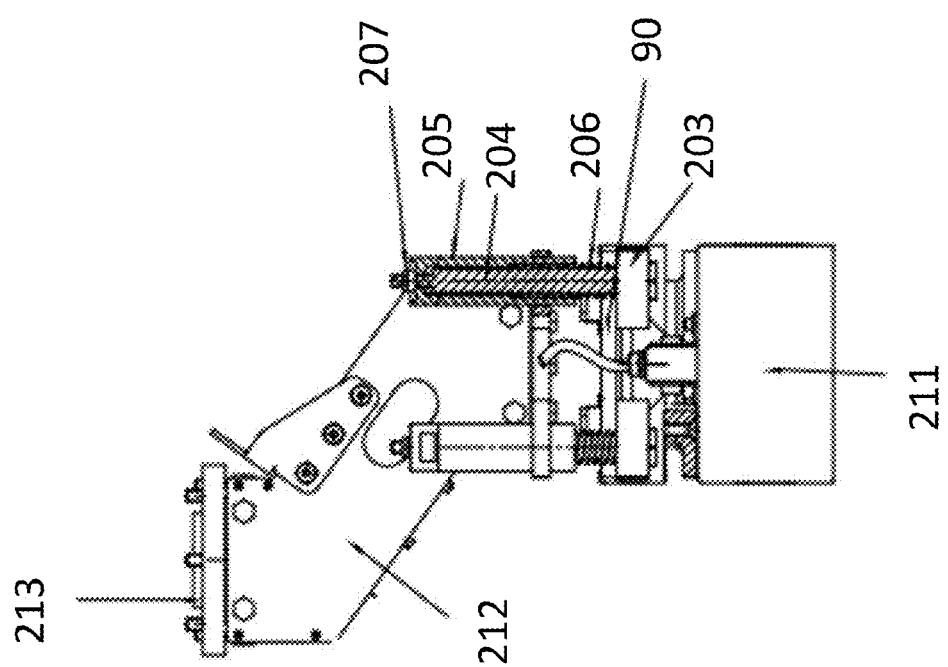
FIG. 22 shows a side view of the compensation unit shown in FIG. 20.

In FIGS. 20 to 22, a second embodiment of a compensation unit in accordance with the invention is shown. This compensation unit combines a compensation unit with a spherical operation as is shown in FIGS. 18 and 19 with a compensation unit with a linear operation in order thus to increase the compensation path.

The total compensation unit 200 in this respect first comprises the spherical compensation part 201 which substantially corresponds in design to the first embodiment of a compensation unit and combines it in series with a second compensation part 202 which has a linear operation.

As can in particular be recognized well in FIG. 21, the spherically operating compensation part 201 has the same mechanical design as the first embodiment of a compensation unit in accordance with the invention, with the same reference numerals also being used for this purpose. In this respect, a base element 90 is in particular provided at which the compensation plate 91 is arranged and is engaged around by holding elements 92 of the base element 90. A spring arrangement 93 which presses the compensation plate 91 toward the holding regions 92 is arranged between the base element 90 and the compensation plate 91. In this respect, adjustment elements 97 are shown via which the preload of the spring arrangement 93 can be changed.

The design of the spherically operating compensation part 201 differs from the first embodiment of a compensation unit in accordance with the invention only with respect to the sensor which is used for detecting a compensation movement. Unlike in the first embodiment, in this respect a light barrier is used having a transmitter 99a and a receiver 99b whose light path runs through a bore 98 through the compensation plate 91. If the compensation plate 91 is deflected in this respect, it interrupts the light path of the light barrier.

The sensor thus recognizes in accordance with the invention the compensation movement of the spherically operating compensation part 201. No sensor is in contrast provided for the linearly operating compensation part 202.

The linearly operating compensation part 202 is in this respect arranged between the base element 90 and the gripping arm. In this respect, fastening regions 203 at which bars 204 are arranged are provided in the corner regions of the base element 90. The bars 204 are guided in a linearly displaceable manner in guides 205 which are arranged at a plate 210. The plate 210 is then in turn connected to the end of the gripping arm. The movement of the bars 204 in the guides 205 takes place against the preload of a spring arrangement 206 which can be set via adjustment elements 207.

The two-stage compensation unit in accordance with the present invention is combined in the embodiment with a magnetic gripper 211 and can be coupled via a cropped gripping arm extension 212 to a gripping arm, in particular to a robot arm. For this purpose, the gripping arm extension 212 has a coupling surface 213 with which it can be coupled to the last pivot joint of a robot arm.

The two compensation parts 201 and 202 of the compensation unit are configured in this respect such that the spherically operating compensation unit 201 deflects first and only then the linearly operating compensation unit 202. The linearly working compensation unit 202 can in this respect have a compensation path between 1.5 and 5 cm, preferably between 2 and 3 cm. This compensation path allows the movement of the gripper to be braked in good time in the event of a collision before the total compensation path of the compensation unit has been utilized.

The preload of the spring units of the second embodiment of a compensation unit could be set in the same manner as the spring load in the first embodiment of a compensation element in accordance with the invention. In this respect, the preload of the spring unit 93 could in particular be set so that it also takes up the static loads from the griper and a workpiece hung on with a gripper pivoted to the side by 90° without deflecting the compensation unit. The preload of the spring unit 206 of the linear part of the compensation unit were then be set correspondingly greater. In this respect, however, it must be taken into account that the preloads of the two parts of the compensation unit have to be set so that the compensation units still deflect beneath the maximum load limit of the robot arm. This is in particular difficult to realize with very heavy grippers or very heavy workpieces in which the static load already lies close to the maximum load of the gripping arm.

Alternatively, the preload of the spherical part of the compensation unit can therefore be set such that it only takes up the static load by the magnetic gripper when it is located in a position directed 90° to the side, but already deflects with a workpiece hung on in this position.

The present invention in this respect makes use of the fact that the gripper with the picked up workpiece can be moved immediately after the picking up into a travel position in which the gripping surface faces downward so that the static loads by the gripper and the workpiece are taken up by the compensation unit without it being deflected. A slanted orientation of the gripper is, in contrast, only necessary on the traveling toward the workpiece to bring the gripping surface of the gripper into coverage with the main surface or with the engagement points of the workpiece.

In this respect, the gripper advantageously travels perpendicular to the gripping surface toward the workpiece, picks it and is then traveled back in the opposite direction again together with the workpiece. In this respect, the signal of the sensor of the compensation unit is not considered for a certain path distance on the moving back in order not to evaluate a deflection of the compensation unit solely due to the static load by the workpiece hung on and/or due to dynamic loads due to the traveling of the gripping arm erroneously as a collision. During this path distance, the gripper is simultaneously traveled into a travel position in which the gripping surface and thus the tool face vertically downwardly and thus do not act against the spring elements of the compensation unit.

If the gripper is moved back by a certain distance and if it was pivoted in the travel position, the signal of the sensor of the compensation unit is again used to detect collisions of the gripper or of the workpiece with interference edges.

On the traveling of the gripper toward a workpiece, the signal of the sensor of the compensation unit can moreover be utilized to detect the contact of the gripper with the workpiece. The gripper is in this respect traveled slowly to the workpiece until the compensation unit deflects.

Independently of the exact embodiment of the compensation unit, in this respect in accordance with the present invention, work can be carried out with different travel speeds for the gripping arm depending on the region in which the gripper is located. The gripping arm can in this respect be moved in fast motion, i.e. at a high speed, in a region in which the gripper is located outside the container and thus no collision with interfering edges is to be feared. If the gripper is, in contrast, located in the region of the container so that collisions have to be anticipated, it preferably works at a second, lower speed. The speed is in this respect selected so that the gripper can be stopped on a collision with an interference edge before the compensation path of the compensation unit is completely used up and the compensation unit does not permit any further compensation movement. In the near region to the workpiece to be picked up, the gripper is furthermore preferably traveled at a third, even lower speed. This still allows a certain travel path of the gripper or gripping arm on the detection of a collision before its movement has to be stopped.

Embodiments of the methods in accordance with the present invention will now be presented in more detail again with reference to flowcharts. They can preferably be carried out using apparatus such as were described above.

FIG. 32 in this respect shows the routine of the detection of the workpieces in an embodiment of the present invention, and indeed both for the case that workpieces randomly arranged in a container are detected and workpieces randomly arranged on an intermediate station are detected.

In step 100, the system is located in a starting state. The gripper for picking the workpieces can in particular be arranged outside the detection region in this starting state. The gripper can for this purpose either be set down in a parking position or can carry out actions in a region outside the detection region such as, for example, placing down an already picked workpiece.

In step 101 or 106, a measurement now takes place by the sensors of the object recognition device. For this purpose, in particular a 3D laser scanner can be used in the embodiment. With the 3D laser scanner used in the embodiment for detecting the workpieces in the container, the 3D laser scanner is first traveled into a measuring position above the container from where the scanner is pivoted over the detection region. Alternatively, a detection during the horizontal travel movement of the 3D laser scanner would also be possible. On the detection of the workpieces on the intermediate station in accordance with step 106, the sensor is, in contrast, fixedly installed, with it being pivoted by pivoting over the detection region.

Alternatively to the use of a 3D laser scanner, a camera system or a combination of a camera system and a laser scanner could also be used. A 2D or 2.5D detection by means of a camera can in particular also be considered in this respect.

In step 102, the data are now evaluated and the workpieces identified.

The identified workpieces are evaluated with regard to their positions toward one another. It is in particular determined in this respect which workpieces lie highest and which workpieces are at least partly covered by other workpieces. A selection is hereby prepared for the decision which part is suitable for picking.

In step 103, a decision is now made as to which part is to be picked in the next step. If this is not possible using the existing data, a detection can be carried out again in a new cycle, for which purpose the system moves back into the starting state in step 107.

If, in contrast, a workpiece was selected, a track planning for the gripper takes place in step 104. The determined parameters of the part to be picked which describe the position and spatial arrangement of the part are used as the basis for the track planning. The system in this respect knows its current location and the target coordinates. The path, the so-called track, can then be calculated with the aid of the determined spatial data.

In this respect, a collision identification also advantageously takes place in which the gripper and the container are represented by geometrical data and the planned track is simulated in order thus to determine possible collisions in advance and to preclude them in the track planning by determining an alternative path.

In step 105, the controlling of the gripper and the picking of a workpiece take place using the data thus calculated.

Figure 24:
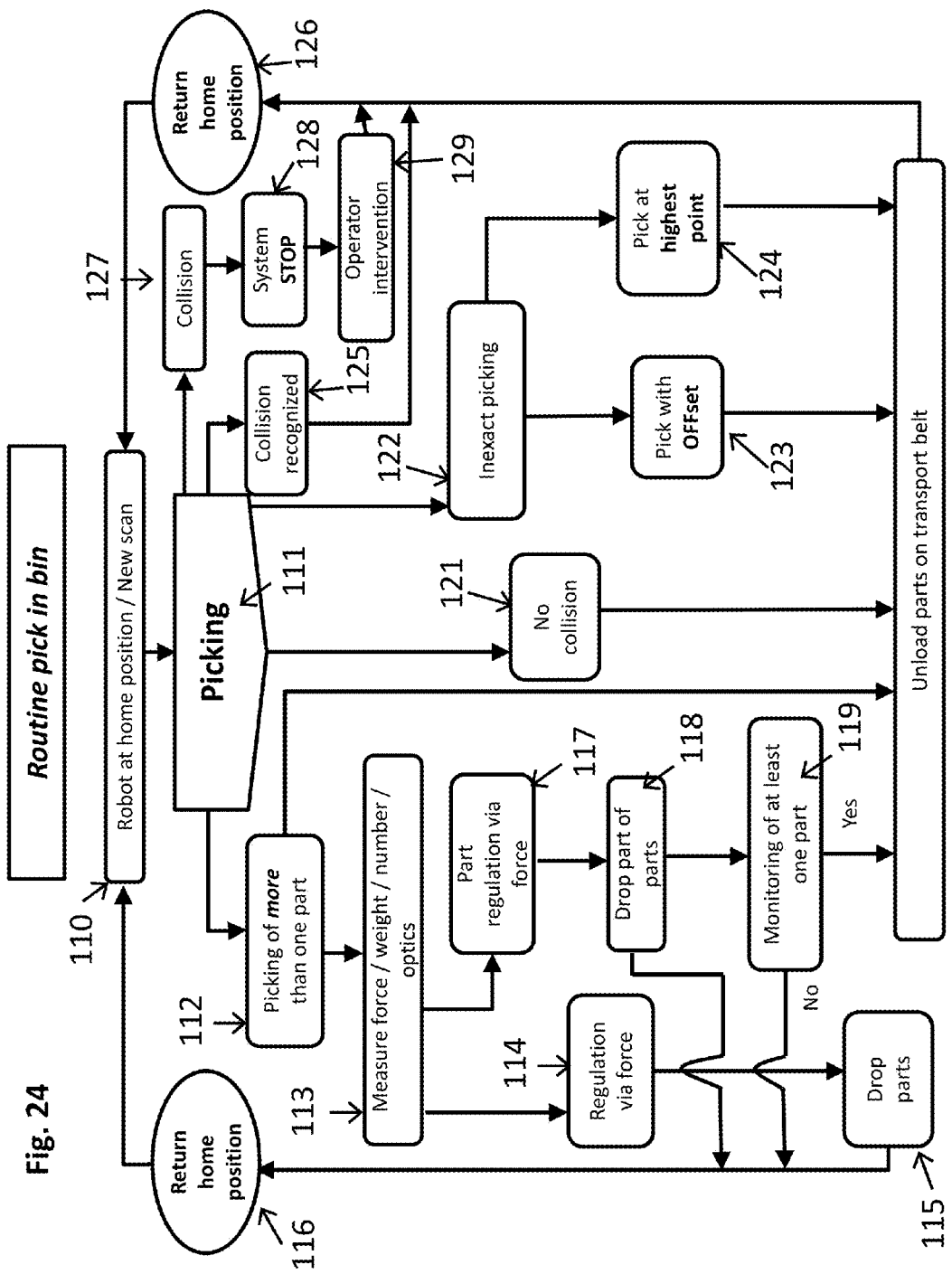
FIG. 24 shows a flowchart of a method for the picking in accordance with the invention of workpieces from a container.
Figure 25:
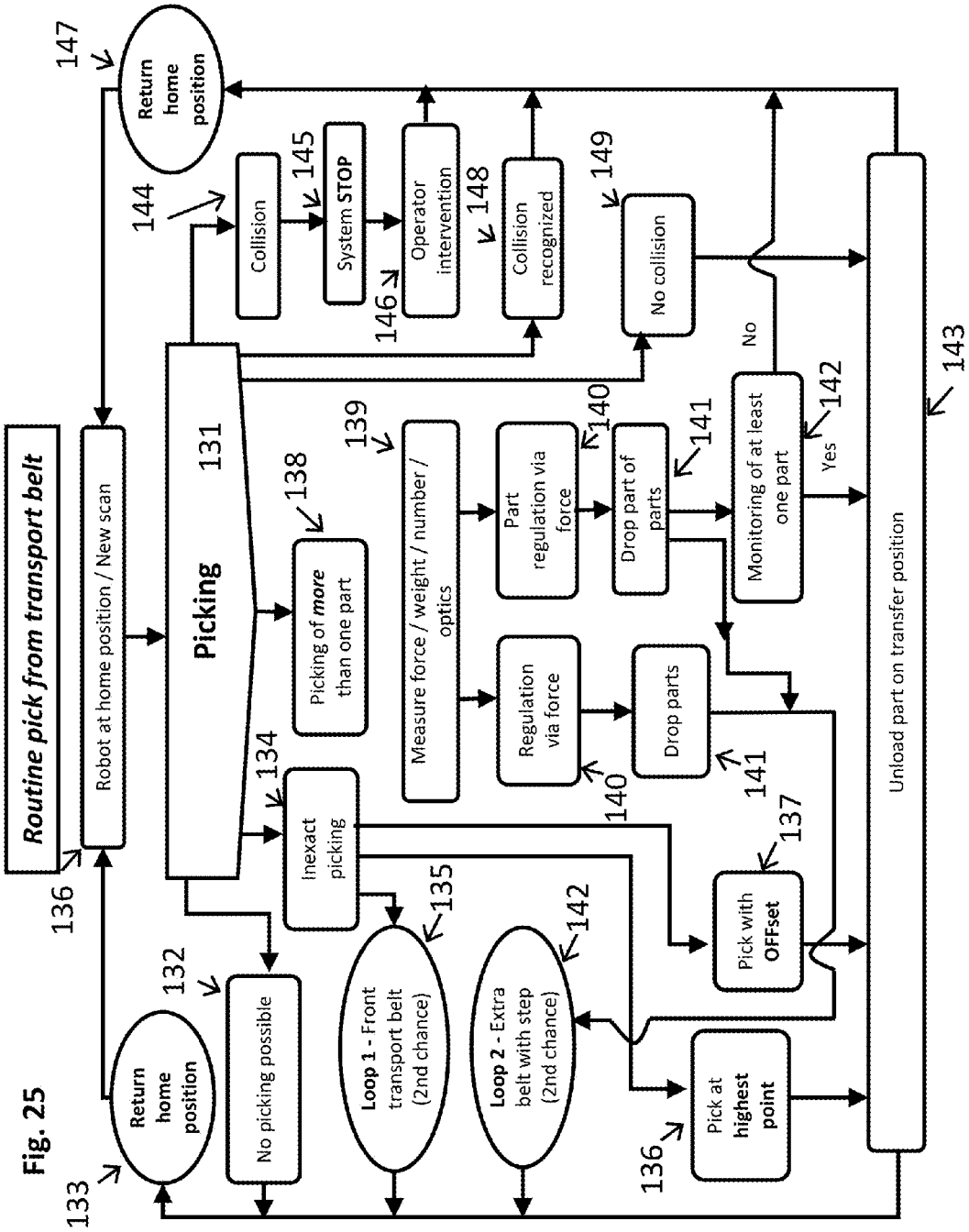
FIG. 25 shows a flowchart of a method for the picking in accordance with the invention of workpieces from an intermediate station.

Before now the different picking strategies in accordance with the invention are shown next to one another with reference to FIGS. 24 and 25, the possibilities for the design of an apparatus in accordance with the invention should be shown again in overview by which the corresponding strategies can be implemented.

An apparatus in accordance with the present invention can comprise two grippers. A first gripper is used to roughly pick the parts from the bin. A second gripper is provided for the precise picking and singularization on an intermediate station which can in particular be equipped with a transport belt. The second gripper places the workpieces on a further intermediate station or on a target receiver for a measurement treatment or work treatment of the workpieces. Which type of gripper is use depends on the geometry, the design, the size and/or the weight of the workpieces to be picked and/or on the number of gripping zones and on the geometry and the design of the gripping zone.

The workpieces can, however, possibly catch with one another, lie above one another or also remain stuck. They can have gripping zones which are not sufficient for a direct picking from the bin since they are not sufficiently accessible in certain positions which they can adopt with a plurality of parts in the bin. If the parts in this respect possibly only have a specific gripping zone, a targeted, direct picking with a mechanical gripper proves not to be sufficiently reliable and is moreover slow and prone to problems.

In a preferred case, the first gripper is therefore a magnetic gripper and the second gripper is a mechanical gripper.

The use of a magnetic gripper for the pick in the bin or the container has the advantage that no exact picking in a precise gripping zone is required. Furthermore, with a magnetic gripper, a picking at different gripping points of a workpiece is usually possible. A picking at the highest point of the workpiece is also in particular usually possible. Furthermore, with a magnetic gripper, a simultaneous picking of a plurality of parts is possible to place them on the intermediate station. In accordance with the invention, a fast and one hundred percent emptying of the bin is thus possible by the use of a magnetic gripper.

A mechanical gripper has the advantage that the part can be picked precisely in a gripping zone so that the workpiece can subsequently be placed individually in a defined position on or in a receiving station. The receiving station can in this respect be the receiving station of a further intermediate station or the target receiver of a measurement station or processing station. The workpiece can equally be placed on an intermediate station which serves as a buffer station or as a demagnetization station or measurement station.

The preferred case of a combination of a magnetic first gripper and a mechanical second gripper is in particular used with workpieces having a position-orientated gripping zone and/or an asymmetrical, symmetrical or rotationally symmetrical contour with a corresponding size and weight. A magnetic gripper can in this respect naturally only be used when the workpiece can be picked by a magnetic gripper, that is comprises metal, for example.

In this respect, the magnetic gripper places the workpieces on an intermediate station, where they are detected again so that they can now be picked directly by the mechanical gripper and can then be placed onto a processing station, measurement device or a transport belt.

The following further combinations for the configuration of the first and second grippers are likewise conceivable: mechanical/mechanical, pneumatic/mechanical, mechanical/pneumatic, pneumatic/pneumatic and magnetic/pneumatic. Any desired other combinations of mechanical and/or pneumatic and/or magnetic grippers are also conceivable.

The grippers can in this respect each be moved either by a robot arm or a linear portal or a surface portal. Optionally, the respective grippers can be combined with a compensation unit and/or with a force torque sensor depending on which strategies are to be used in picking. The compensation unit in this respect improves the system security in that it prevents the necessity of an operator intervention on collisions.

The intermediate station has a transport belt which transports the workpieces from the placing region into a removal region. In this respect, the placed down parts are conveyed via a workpiece slide to the transport belt. So that the parts placed down by the magnetic gripper come to lie as ideally as possible on the transport belt, the transport belt is bounded by slanted metal sheets which allow workpieces sliding onto the margin of the transport belt to slide back onto the belt. At the same time, a flap which can be moved by the workpieces, in particular a pivotable metal sheet or a transverse bar, can be installed above the transport belt so that parts lying above one another can still be singularized or parts not positioned correctly tilt over. The workpieces can hereby be better detected by the scanner or camera and can be picked better.

A design with only one gripper which picks first in the container, places the workpiece on an intermediate station and then picks the workpiece again for singularization would be alternatively conceivable. The first gripper would thus also be used for removing the workpiece from the intermediate station and for placing it on a further intermediate station or the target receiver.

The invention in this respect comprises the following methods which can in particular be carried out in the operation of an apparatus in accordance with the invention:

Sorting Out Workpieces:

If the first gripper is combined with a force tongue sensor, a selection can already be carried out at this point by weight of the workpieces. Workpieces which lie outside a specific limit with respect to weight can in particular be sorted out. They can in particular be sorted out into a sorting out container.

A sorting out by the first gripper is also possible in that workpieces which are recognized as lying outside a predefined specification on detection are picked up and are placed in a sorting out container instead of on the intermediate station.

Workpieces which are detected on the intermediate station and which lie outside a predefined specification can be sorted out. This can in particular take place by a further transport of such workpieces into a sorting out container at the end of the transport belt.

It is equally conceivable to hold a just picked part at a measurement device where e.g. geometries, surfaces (for example a lacquering) and/or markings (e.g. by codes) can be measured and/or inspected. If this measurement indicates that a part lies within a predefined specification, the picked part is placed down normally, e.g. on the intermediate station or on a target receiver. If it is outside the specification, it is sorted out.

Prevention of System Stops:

A system stop can be prevented by picking with an offset at which the gripper slightly misses the ideal picking position. In this case, the gripper travels back around 25 mm and starts to travel again in order to pick more precisely this time.

Furthermore, it can be recognized via a force torque sensor when too many parts were picked at once. In particular when hereby the maximum load of the robot could be exceeded, the load can be reduced by a dropping of the workpieces back into the container. The parts remaining at the gripper can then be unloaded at the intermediate station.

If the situation arises at the intermediate station that the object recognition device cannot detect the part exactly since the parts e.g. lie above one another and cannot be detected exactly or that a picking is not possible or only takes place with insufficient accuracy, the following strategies can be used:

On the one hand, a further, lower-lying transport belt can be used on which the parts not picked travel on in order thus to adopt the required position by falling over a stage. The workpiece thus has a second chance and is again supplied to the transport belt for precise picking (Loop 2). In this respect, e.g. with smaller parts which can catch with one another, provision can also be made that the transport path guided as a circuit has singularization devices which pulls the parts apart and hereby singularizes them. For this purpose, sheet metals or transverse bars can, for example, be used which narrow the transport belt and/or brush the workpieces.

If the parts are admittedly picked, but no exact picking takes place, this can be registered via a sensor. For this purpose, for example, a pneumatic cylinder can be provided at the mechanical gripper. This not only recognizes the gripping position within a necessary limit for a subsequently precise placing of the parts, but also has the consequence of a stabilization of the part in picking. On a recognized inexact picking, the second gripper can place the workpiece back onto a front part of the transport belt of the intermediate station. The part thus also has a second chance for exact picking (Loop 1).

On picking a workpiece from a container, the above-named strategies can in particular be combined to form the routine shown in FIG. 24:

In this respect, the system is in a base state in step 110 in which the track calculated by the track planning is predefined for the gripper. In step 111, the attempt of picking then takes place using the calculated track planning.

If in step 112 more than one workpiece is picked, the further procedure depends on whether this can be recognized by a sensor. If this is not the case, the workpieces are simply unloaded onto the transport belt. Otherwise it is possible to carry out a measurement with respect to force, weight, number or optics in step 113. A force torque sensor can in particular be used in this respect. Alternatively, a 3D laser or a 2D camera or a 2.5D camera can also be used here. A decision now takes place by recognizing predefined limits whether too many parts were picked up. If too many parts were picked up, a falling of all parts back into the bin can take place either in step 114 by a switching off or reducing of the gripping force of the gripper. After this step 115, a completely new picking procedure takes place, including detection of the parts. Alternatively, in step 117, a part regulation can take place by partial reduction of the force of the gripper and thus partial dropping of the workpieces back into the bin. In step 119, a check can again be made whether at least one part is hanging on. If such a part is hanging on, this can be unloaded on the intermediate station in step 120. If no part is hanging on, a new picking cycle can be started directly.

If, in contrast, it is recognized in the measurement that only one part is hanging on, this can be unloaded directly. If it is recognized in the measurement that no part at all was picked up, a new picking cycle can start immediately.

It is shown in step 122 how it is possible to proceed if a centered picking is not possible. In this case, the gripper either searches for the highest point of the selected part and grips at this point again in step 124 or it picks with an offset in step 123, i.e. it travels back by about 25 mm from the part and then travels toward the part again.

Alternatively, such a decision can already take place when it is recognized in the selection of the workpiece to be picked that none of the parts is centered in a pickable manner. In this case, a picking can already be planned in the track planning with an offset at which the gripping surface and the main surface of the workpiece do not fully overlap or a picking at the highest point can be planned.

The system can deal with collisions as follows in this respect: If no collision occurs, as in step 121, the workpieces can thus be unloaded on the intermediate station. If, in contrast, in step 125, a collision is recognized, for example, by a force torque sensor and/or a compensation unit, the control still allows a defined travel path. If this is also exceeded, the picking procedure is stopped and the system starts a new picking cycle. If, in contrast, the collision in step 127 is only recognized by the emergency stop function of the robot, this results in a system stop in step 128 which can only be cancelled again by an operator intervention 129.

On the picking of a workpiece from the intermediate station, and in particular from the transport belt of the intermediate station, the strategies in accordance with the invention can in particular be combined to form the routine shown in FIG. 25:

First, in steps 130, a workpiece travels on the transport belt into the recognition region of the object recognition device and the transport belt stops. Then the recognition is carried out, in particular a scanning by a 3D laser scanner. It can be pivotable or travelable in a vertical or horizontal manner or can be arranged at a fixed position above the transport belt. Alternatively, a taking of an image can take place via a 2D, 2.5D or 3D camera. After the evaluation of the data and the corresponding determination of a track for the gripper, as was already previously described, the picking then takes place in step 131.

The picking of more than one part in step 138 can trigger the same procedure as in the picking from a container. If in this respect a mechanical gripper is used, only the possibility remains, however, of dropping all parts in steps 140 and 141.

The procedure in the event of a collision in steps 148 or 144 is also identical to the procedure on picking from a container.

Figure 23:
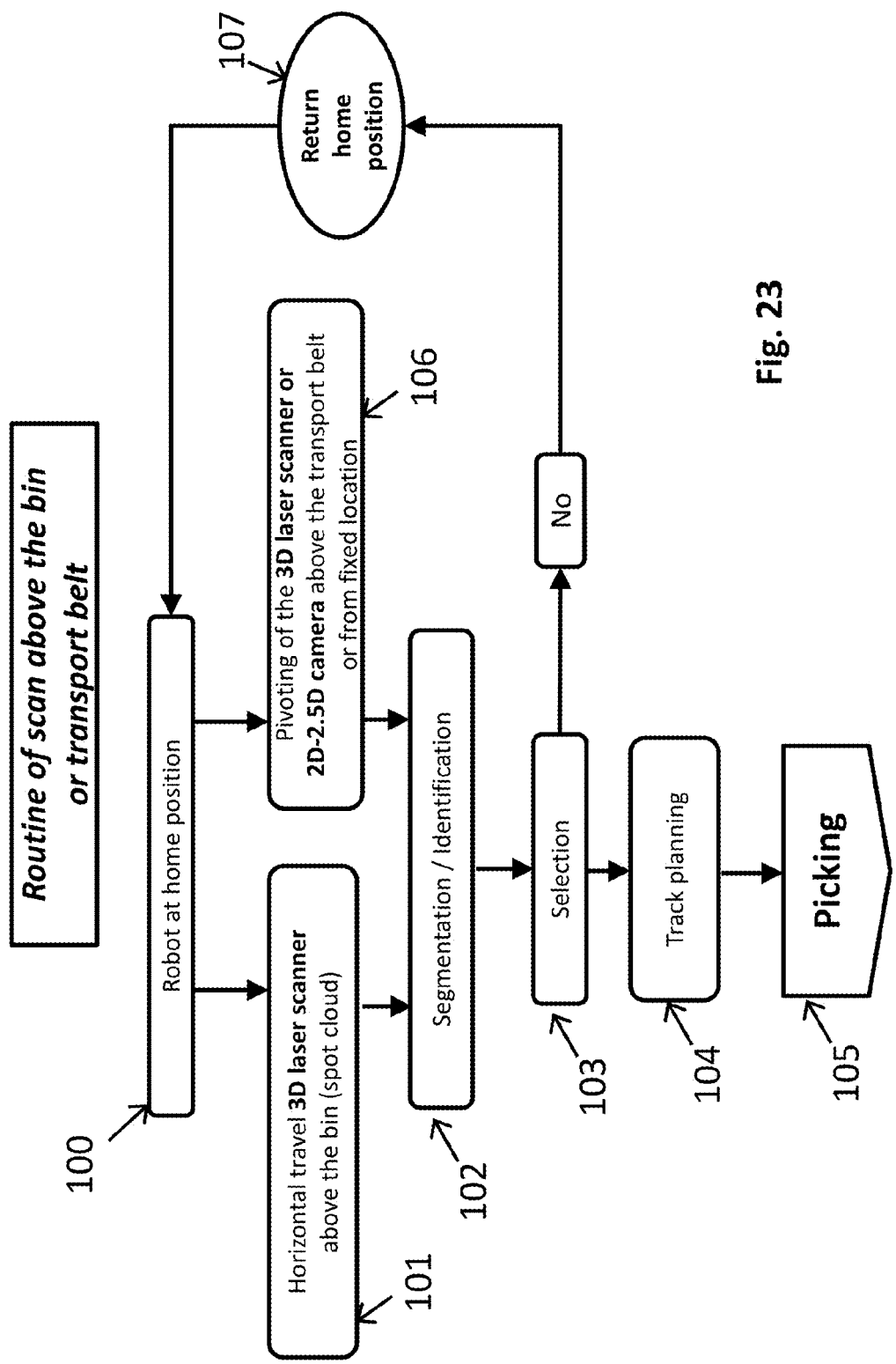
FIG. 23 shows a flowchart of a method for detecting workpieces in accordance with the present invention.

On an inexact picking in step 143, a procedure can likewise be following as was presented with respect to the corresponding steps in FIG. 23. These strategies can in particular be used when a magnetic gripper is used as the second gripper.

Furthermore, when the picking accuracy in step 134 is no longer sufficient, the part can again be placed onto the front part of the transport belt (Loop 1) so that the workpiece can again be detected and picked.

If no recognition is possible or if no workpiece can be picked, the workpiece can again be conveyed over a return path onto the transport belt in a corresponding embodiment of the intermediate station so that a repeat chance for picking is given (Loop 2). Otherwise the workpiece which cannot be picked has to be traveled into a sorting out container.

The present invention makes possible a handling of the workpieces with fast cycle times, small error rates and a great accuracy in picking with the above-presented apparatus and methods. In this respect, a high process security results by the avoidance of system downtimes which would require operator intervention. Furthermore, the present invention allows a 100 percent emptying of the containers.

The invention claimed is:

1. An apparatus for automated handling of workpieces, comprising
   an object recognition device for detecting the workpieces;
   a gripper arranged at a gripping arm for picking up the workpieces;
   a control for evaluating data of the object recognition device, for track planning and for controlling the gripping arm and the gripper; and
   a compensation unit which allows an evasion movement of the gripper, wherein
      the compensation unit only allows the evasion movement of the gripper on the exceeding of a predefined first load of the gripping arm and remains rigid below the first load, wherein the first load is larger than a load exerted on the gripping arm solely by the gripper and the picked up workpieces at least in a travel position of the gripper.

2. The apparatus in accordance with claim 1, wherein the compensation unit has a sensor arrangement which recognizes an evasion movement occurring due to a collision, wherein the control comprises a first overload function that detects and monitors, based on the sensor arrangement, an occurrence of a collision state, wherein the first overload function permits, upon a detection of a collision state, a continuation of a normal travel operation of the gripping arm for a permitted travel path, and stops the normal travel operation of the gripping arm and restarts a new picking up procedure if the collision state persists and the normal travel operation of the gripping arm exceeds the permitted travel path.

3. The apparatus in accordance with claim 2, wherein the apparatus comprises two compensation units connected in series, with a first compensation unit being a compensation unit having a spherical compensation movement and a second compensation unit being a compensation unit having a linear compensation movement; wherein the two compensation units are preloaded via separate preloading means and deflect at different loads of the gripping arm.

4. The apparatus in accordance with claim 3, wherein the control is configured so that it changes an orientation of the gripper after picking up of a workpiece with a slanted gripper such that static forces acting on the compensation unit by a gripper's own weight and a weight of the workpiece are reduced.

5. The apparatus in accordance with claim 4, wherein the gripper is directed downwardly into a travel position.

6. The apparatus in accordance with claim 4, wherein the change in the orientation takes place on lifting of the workpiece and wherein a deflection of the compensation unit on lifting of the workpiece is not treated as a collision state.

7. The apparatus in accordance with claim 2, wherein the permitted travel path corresponds to a second load of the gripping arm and wherein the control has a second overload function which intervenes on the exceeding of a predefined third load of the gripping arm, with the third load being larger than the first load and the second load.

8. The apparatus in accordance with claim 7, wherein the second overload function caries out an emergency stop on recognition of an overload so that the gripping arm can only be released again by a manual user intervention.

9. The apparatus in accordance with claim 7, wherein the second overload function monitors a load on one or more drives of the gripping arm for detecting a load that exceeds the predefined third load.

10. The apparatus in accordance with claim 2, wherein the first overload function, if it detects that the collision state is no longer present and the permitted travel path is not exceeded, allows the normal travel operation of the gripping arm to continue without interruption.

11. The apparatus in accordance with claim 2, wherein the first overload function monitors, on detection of the collision state, travel path information of the gripping arm provided by the control of the gripping arm for monitoring whether the normal travel operation of the gripping arm exceeds the permitted travel path.

12. The apparatus in accordance with claim 2, wherein the permitted travel path is smaller than a compensation path provided by the compensation unit.

13. The apparatus in accordance with claim 12, wherein the first overload function initiates, once the normal travel operation of the gripping arm exceeds the permitted travel path, a braking operation, and the permitted travel path is chosen such that the braking operation brings the gripping arm to a stop before it exceeds the compensation path provided by the compensation unit, taking into account processing time of the control and reaction times of drives of the gripping arm.

14. The apparatus in accordance with claim 1, further comprising a base unit and a compensation plate which is engaged around by a holding region of the base unit and is preloaded against the base unit and the holding region via a spring arrangement such that the compensation unit only allows an evasion movement between the base unit and the compensation plate on the exceeding of a predefined first load and remains rigid below the first load, with one or more sensors advantageously being provided which monitor a placing of the compensation plate at the holding region, with the one or more sensors advantageously being arranged in the holding region.

15. The apparatus in accordance with claim 14, wherein the compensation plate is round and/or an edge of the compensation plate is rounded; and/or wherein the evasion movement between the base unit and the compensation plate allows a spherical compensation movement and the compensation unit furthermore has a second compensation unit which allows a linear compensation movement, with the two compensation units advantageously being preloaded via separate preloading means and/or deflecting at different loads of the gripping arm; and/or wherein the second compensation unit advantageously has one or more bars which are linearly guided in a guide and are preloaded via a spring.

16. A method of operating an apparatus for automated handling of workpieces, wherein the apparatus comprises:
    an object recognition device for detecting the workpieces;
    a gripper arranged at a gripping arm for picking the workpieces;
    a control for evaluating data of the object recognition device, for track planning and for controlling the gripping arm and the gripper;
    and a compensation unit which allows an evasion movement of the gripper on the exceeding of a first load of the gripping arm, comprising
        selecting the first load to be larger than forces occurring in normal operation due to a gripper's own weight and a weight of a workpiece at least in a travel position of the gripper, wherein the compensation unit remains rigid below the first load so that evasion movements of the gripper are prevented in normal operation.

17. The method in accordance with claim 16, wherein after the picking up of a workpiece with a slanted gripper, an orientation of the gripper is changed such that static forces acting on the compensation unit by the gripper's own weight and the weight of the workpiece are reduced.

18. The method in accordance with claim 17, wherein the gripper is directed downwardly into a travel position.

19. The method in accordance with claim 17, wherein the change in the orientation takes place on lifting of the workpiece and wherein a deflection of the compensation unit on lifting is not treated as a collision state.

20. An apparatus for the automated handling of workpieces, comprising:
    an object recognition device for detecting the workpieces;
    a gripper arranged at a gripping arm for picking the workpieces;
    a control for evaluating data of the object recognition device, for track planning and for controlling the gripping arm and the gripper; and
    a compensation unit which allows an evasion movement of the gripper,
    wherein the control is configured so that it changes an orientation of the gripper after picking up of a workpiece from a slanted gripper position to a travel position of the gripper such that static forces acting on the compensation unit by a gripper's own weight and a weight of the workpiece are reduced,
    wherein the compensation unit only allows an evasion movement of the gripper on the exceeding of a predefined first load of the gripping arm and remains rigid below the first load, wherein the first load is larger than a load exerted on the gripping arm solely by the gripper and the picked workpiece in the travel position of the gripper, while the static or dynamic load exerted on the gripping arm solely by the gripper and the picked workpiece in the slanted gripper position may exceed the first load.

21. The apparatus in accordance with claim 20, wherein the gripper is directed downwardly in the travel position.

22. The apparatus in accordance with claim 20, wherein the change in the orientation takes place on lifting of the workpiece and wherein a deflection of the compensation unit on lifting of the workpiece is not treated as a collision state.

* * * * *